(12) United States Patent
Kume et al.

(10) Patent No.: US 12,703,377 B2
(45) Date of Patent: Aug. 11, 2026

(54) PRESENTATION CONTROL DEVICE, PRESENTATION CONTROL PROGRAM, AUTOMATED DRIVING CONTROL DEVICE, AND NON-TRANSITORY TANGIBLE STORAGE MEDIUM STORING AUTOMATED DRIVING CONTROL PROGRAM

(71) Applicant: DENSO CORPORATION, Kariya-city (JP)

(72) Inventors: Takuya Kume, Kariya-city (JP); Kazuki Izumi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 193 days.

(21) Appl. No.: 18/441,545

(22) Filed: Feb. 14, 2024

(65) Prior Publication Data

US 2024/0182058 A1 Jun. 6, 2024

Related U.S. Application Data

(63) Continuation of application No. PCT/JP2022/027546, filed on Jul. 13, 2022.

(30) Foreign Application Priority Data

Aug. 23, 2021 (JP) ................................ 2021-135816
Dec. 1, 2021 (JP) ................................ 2021-195504
Mar. 29, 2022 (JP) ................................ 2022-054409

(51) Int. Cl.
*B60Q 1/00* (2006.01)
*B60W 30/18* (2012.01)
(Continued)

(52) U.S. Cl.
CPC ...... *B60W 50/14* (2013.01); *B60W 30/18163* (2013.01); *B60W 30/182* (2013.01);
(Continued)

(58) Field of Classification Search
CPC .......... B60W 50/14; B60W 30/18163; B60W 30/182; B60W 50/0097; B60W 60/005;
(Continued)

(56) References Cited

U.S. PATENT DOCUMENTS

2006/0155465 A1* 7/2006 Jung ..................... G01C 21/20 701/533
2007/0168121 A1* 7/2007 Adachi ............. G01C 21/3837 701/532
(Continued)

FOREIGN PATENT DOCUMENTS

JP 2005324661 A 11/2005
JP 2016194813 A 11/2016
(Continued)

OTHER PUBLICATIONS

Legend Honda Sensing Elite owner's manual, Honda Motor Co., Ltd., 2021, p. 351.

*Primary Examiner* — Anh V La
(74) *Attorney, Agent, or Firm* — Harness, Dickey & Pierce, P.L.C.

(57) ABSTRACT

By a presentation control device or a non-transitory tangible computer-readable storage medium storing a presentation control program for controlling presentation of information related to an automated driving function that enables a subject vehicle to travel with autonomous traveling control with no periphery monitoring obligation of a driver, a state of automated driving control is grasped, and notification indicating the state of the automated driving control is provided. By an automated driving control device or a non-transitory tangible computer-readable storage medium storing a presentation control program, a change in a route
(Continued)

to a destination set for the subject vehicle is grasped, and whether to permit continuation of the autonomous traveling control is determined.

30 Claims, 19 Drawing Sheets

(51) Int. Cl.

| | |
|---|---|
| ***B60W 30/182*** | (2020.01) |
| ***B60W 50/00*** | (2006.01) |
| ***B60W 50/14*** | (2020.01) |
| ***B60W 60/00*** | (2020.01) |

(52) U.S. Cl.

CPC ...... *B60W 50/0097* (2013.01); *B60W 60/005* (2020.02); *B60W 2050/0083* (2013.01); *B60W 2050/143* (2013.01); *B60W 2050/146* (2013.01); *B60W 2554/406* (2020.02); *B60W 2556/10* (2020.02); *B60W 2556/40* (2020.02)

(58) Field of Classification Search

CPC ... B60W 2050/0083; B60W 2050/143; B60W 2050/146; B60W 2554/406; B60W 2556/10; B60W 2556/40; B60W 30/18154; B60W 2556/50; B60W 60/0053; G01C 21/34; G01C 21/36; G08G 1/0968; G08G 1/16; G16Y 10/40; G16Y 20/20; G16Y 40/30

USPC ...................... 340/438, 439, 425.5, 435, 436

See application file for complete search history.

(56) References Cited

U.S. PATENT DOCUMENTS

| | | | | |
|---|---|---|---|---|
| 2018/0099676 | A1 | 4/2018 | Goto et al. | |
| 2018/0292833 | A1* | 10/2018 | You | G05D 1/0212 |
| 2019/0283770 | A1* | 9/2019 | Kubota | B62D 15/0255 |
| 2020/0103903 | A1 | 4/2020 | Kuwahara | |
| 2020/0174470 | A1* | 6/2020 | Park | G05D 1/0061 |
| 2020/0198648 | A1* | 6/2020 | Ishioka | G05D 1/0088 |
| 2020/0320999 | A1 | 10/2020 | Kurihara et al. | |
| 2021/0016805 | A1 | 1/2021 | Oba et al. | |
| 2021/0034059 | A1* | 2/2021 | Nagata | G05D 1/0285 |
| 2021/0179138 | A1 | 6/2021 | Terazawa et al. | |
| 2021/0216066 | A1 | 7/2021 | Shimotani et al. | |
| 2022/0063407 | A1* | 3/2022 | Takabatake | G06F 3/1423 |

FOREIGN PATENT DOCUMENTS

| | | | |
|---|---|---|---|
| JP | 2019073280 | A | 5/2019 |
| JP | 2020-038200 | A | 3/2020 |
| JP | 202052974 | A | 4/2020 |
| JP | 2020-149106 | A | 9/2020 |
| WO | WO-2019188398 | A1 | 10/2019 |
| WO | WO-2020031370 | A1 | 2/2020 |
| WO | WO-2020039530 | A1 | 2/2020 |
| WO | WO-2020202432 | A1 | 10/2020 |

* cited by examiner

PRESENTATION CONTROL DEVICE, PRESENTATION CONTROL PROGRAM, AUTOMATED DRIVING CONTROL DEVICE, AND NON-TRANSITORY TANGIBLE STORAGE MEDIUM STORING AUTOMATED DRIVING CONTROL PROGRAM

CROSS REFERENCE TO RELATED APPLICATIONS

The present application is a continuation application of International Patent Application No. PCT/JP2022/027546 filed on Jul. 13, 2022, which designated the U.S. and claims the benefit of priority from Japanese Patent Application No. 2021-135816 filed on Aug. 23, 2021, Japanese Patent Application No. 2021-195504 filed on Dec. 1, 2021, and Japanese Patent Application No. 2022-054409 filed on Mar. 29, 2022. The entire disclosures of all of the above applications are incorporated herein by reference.

TECHNICAL FIELD

The disclosure in this specification relates to a control technique for presenting information related to an automated driving function, and a technique that enables traveling using the automated driving function.

BACKGROUND

In a comparative example, a vehicle control device starts autonomous driving when traffic congestion having a length equal to or greater than a predetermined value occurs.

SUMMARY

By a presentation control device or a non-transitory tangible computer-readable storage medium storing a presentation control program for controlling presentation of information related to an automated driving function that enables a subject vehicle to travel with autonomous traveling control with no periphery monitoring obligation of a driver, a state of automated driving control is grasped, and notification indicating the state of the automated driving control is provided. By an automated driving control device or a non-transitory tangible computer-readable storage medium storing a presentation control program, a change in a route to a destination set for the subject vehicle is grasped, and whether to permit continuation of the autonomous traveling control is determined.

DETAILED DESCRIPTION

Figure 1:
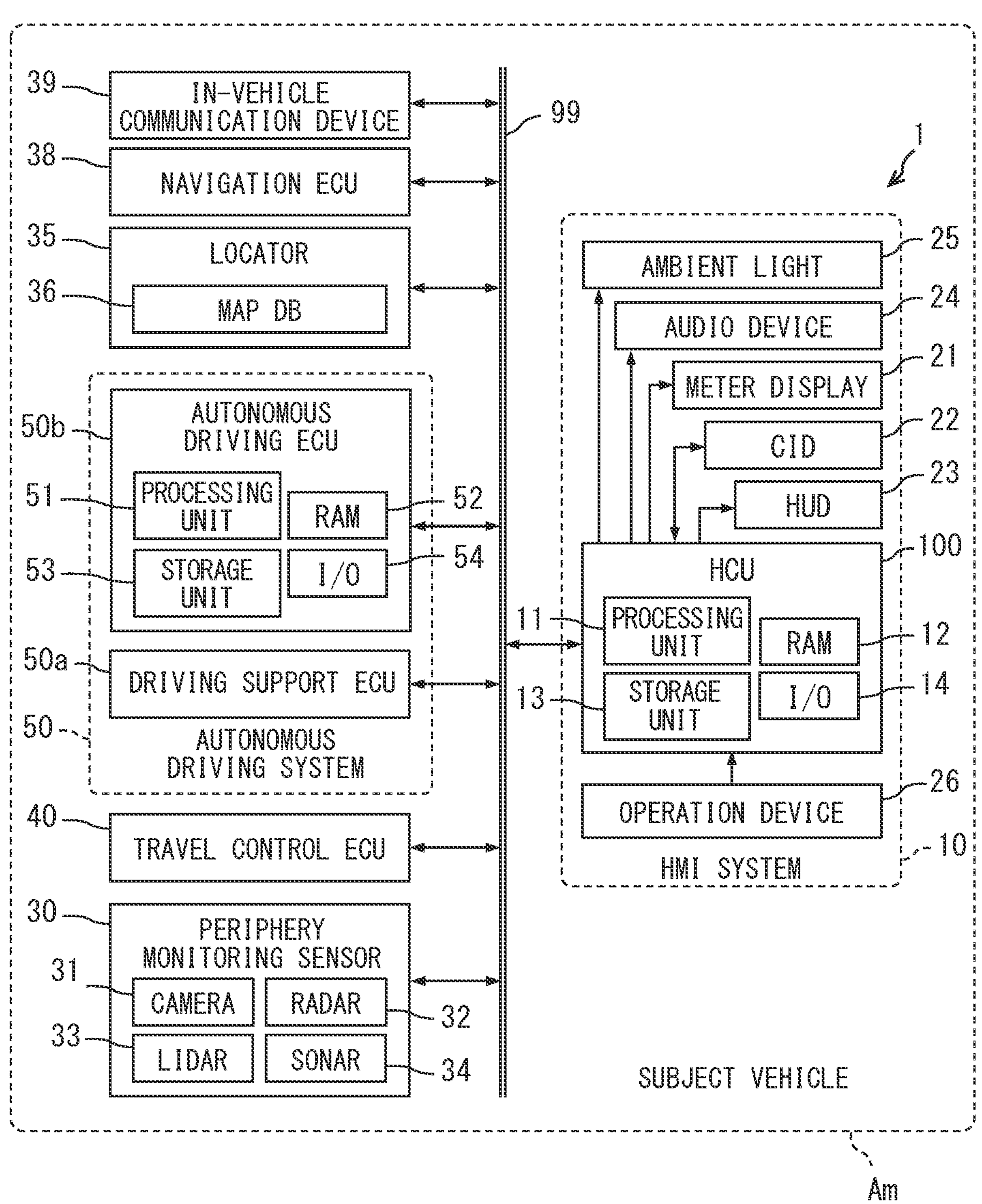
FIG. 1 is a diagram showing an overview of an in-vehicle network including an HCU and an autonomous driving ECU according to a first embodiment of the present disclosure.

In recent years, a technique has been implemented, which enables not only autonomous driving in which a driver has a periphery monitoring obligation but also autonomous driving in which a driver does not have a periphery monitoring obligation. When a route is set, for example, when a destination is newly set, the destination is changed, or the route to the destination is updated during the implementation of the autonomous driving without the periphery monitoring obligation, there is a possibility that the autonomous driving without the periphery monitoring obligation cannot be continued. Such a state change of the autonomous driving related to the route setting may impair the convenience of the driver or the like.

One example of the present disclosure provides a presentation control device, a presentation control program, an automated driving control device, and an automated driving control program capable of ensuring convenience related to route setting in autonomous driving without a periphery monitoring obligation.

According to one example embodiment, a presentation control device controls presentation of information related to an automated driving function that enables a subject vehicle to travel with autonomous traveling control with no periphery monitoring obligation of a driver, and the device includes: a control grasping unit configured to grasp a state of automated driving control performed by the automated driving function after a setting of a route that is set to a destination and set in a state where the automated driving function causes the subject vehicle to be traveling with the autonomous traveling control; and a notification control unit configured to provide notification indicating the state of the automated driving control after the setting of the route.

According to another example embodiment, a non-transitory tangible computer-readable storage medium stores a presentation control program that controls presentation of information related to an automated driving function that enables a subject vehicle to travel with autonomous traveling control with no periphery monitoring obligation of a driver, and the program causes at least one processor to execute a process of: grasping a state of automated driving control performed by the automated driving function after a setting of a route that is set to a destination for the subject vehicle and set in a state where the automated driving function causes the subject vehicle to be traveling with the autonomous traveling control; and providing notification indicating the state of the automated driving control after the setting of the route.

In these example embodiments, when the route to the destination is set in the subject vehicle traveling under the autonomous travel control, the state of the automated driving control implemented by the automated driving function after the route is set is notified. Therefore, when the autonomous travel control with no periphery monitoring obligation is ended according to the route setting, the driver can grasp the end of the autonomous travel control in advance. Accordingly, it is possible to ensure the convenience of the autonomous driving related to the route setting.

Further, according to another example embodiment, an automated driving control device enables a subject vehicle to travel with autonomous traveling control with no periphery monitoring obligation of a driver, and the device includes: a route information grasping unit configured to grasp a change in a route to a destination set for the subject vehicle; and a continuation determination unit configured to determine whether to permit continuation of the autonomous traveling control after the route is changed according to a control mode of the autonomous traveling control that is being performed.

Further, according to another example embodiment, a non-transitory tangible computer-readable storage medium stores an automated driving control program that enables a subject vehicle to travel with autonomous traveling control with no periphery monitoring obligation of a driver, and the program causes at least one processing unit to execute a process of: grasping a change in a route to a destination set for the subject vehicle; and determining whether to permit continuation of the autonomous traveling control after the route is changed according to a control mode of the autonomous driving control that is being performed.

In these example embodiments, when the route to the destination set in the subject vehicle is changed, it is determined whether to permit the continuation of the autonomous travel control after the route is changed, according to the control mode of the autonomous travel control being implemented. Therefore, in the case of the control mode in which the autonomous travel control can be continued even after the route is changed, the traveling in the state with no periphery monitoring obligation by the driver can be continued. As described above, if the continuation of the autonomous travel control is permitted even after the route is changed, the convenience of the autonomous driving related to the route setting can be ensured.

Further, according to another example embodiment, an automated driving control device enables a subject vehicle to travel with autonomous traveling control with no periphery monitoring obligation of a driver, and the device includes: a route information grasping unit configured to grasp a change in a route to a destination set for the subject vehicle; and a continuation determination unit configured to determine whether to permit continuation of autonomous traveling control after the route is changed in a state where the subject vehicle is traveling with the autonomous traveling control. The route information grasping unit is configured to further grasp whether a change in the route is a change by a system of the subject vehicle or a change in an input from an occupant of the subject vehicle. The continuation determination unit permits the continuation of the autonomous traveling control also after the route has been changed when the system has changed the route, and limits the continuation of the autonomous traveling control after the route has been changed when the input of the occupant has changed the route.

Further, according to another example embodiment, a non-transitory tangible computer-readable storage medium stores an automated driving control program that enables a subject vehicle to travel with autonomous traveling control with no periphery monitoring obligation of a driver, and the program causes at least one processing unit to execute a process of: grasping a change in a route of a destination set for the subject vehicle; further grasp whether the change in the route is a change by a system of the subject vehicle or a change in an input from an occupant of the subject vehicle; determining whether to permit continuation of autonomous traveling control after the route is changed in a state where the subject vehicle is traveling with the autonomous traveling control; permitting the continuation of the autonomous traveling control also after the route has been changed when the system has changed the route; and limiting the continuation of the autonomous traveling control after the route has been changed when the input of the occupant has changed the route.

In these example embodiments, when the route is changed by an input of the occupant in a state where the subject vehicle travels under the autonomous travel control, the continuation of the autonomous travel control after the route is changed is restricted. On the other hand, when the route is changed by the system of the subject vehicle, the continuation of the autonomous travel control after the route is changed is permitted. According to the above, it is possible to avoid a situation in which the periphery monitoring obligation by the driver suddenly occurs due to an automatic change of the route by the system. Accordingly, it is possible to ensure the convenience of the autonomous driving related to the route setting.

Further, according to another example embodiment, an automated driving control device enables a subject vehicle to travel with autonomous traveling control with no periphery monitoring obligation of a driver, and the device includes: a route information grasping unit configured to grasp a change in a route to the destination set for the subject vehicle, and further grasp whether the change in the route is accompanied by a change in the destination; a continuation determination unit configured to determine whether to permit continuation of autonomous traveling control after the route is changed in a state where the subject vehicle is traveling with the autonomous traveling control. The continuation determination unit permits the continuation of the autonomous traveling control also after the route has been changed when the destination has been maintained and the route has been changed, and limits the continuation of the autonomous traveling control after the destination has been changed and the route has been changed.

Further, according to another example embodiment, a non-transitory tangible computer-readable storage medium stores an automated driving control program that enables a subject vehicle to travel with autonomous traveling control with no periphery monitoring obligation of a driver, and the program causes at least one processing unit to execute a process of: grasping a change in a route to the destination set for the subject vehicle, and further grasping whether the change in the route is accompanied by a change in the destination; determining whether to permit continuation of autonomous traveling control after the route is changed in a state where the subject vehicle is traveling with the autonomous traveling control; permitting the continuation of the autonomous traveling control also after the route has been changed when the destination has been maintained and the route has been changed; and limiting the continuation of the autonomous traveling control after the destination has been changed and the route has been changed.

In these another example embodiments, when the route is changed by a change of the destination in a state where the subject vehicle travels under the autonomous travel control, the continuation of the autonomous travel control after the route is changed is restricted. On the other hand, when the route is changed while the destination is maintained, the continuation of the autonomous travel control is permitted even after the route is changed. As described above, it is possible to use the autonomous driving with no periphery monitoring obligation for a long time, and thus the convenience of the autonomous driving related to the route setting can be ensured.

Further, according to another example embodiment, a presentation control device controls presentation of information related to an automated driving function that enables a subject vehicle to travel with autonomous traveling control with no periphery monitoring obligation of a driver, and the device includes: a control grasping unit configured to determine whether a route to a destination passes through an unupdated area that requires an update of map data when the route has been searched in a state where the automated driving function causes the subject vehicle to be traveling with the autonomous traveling control using the map data; and a notification control unit configured to provide notification indicating an existence of the unupdated area when the route passes through the unupdated area.

Further, according to another example embodiment, a non-transitory tangible computer-readable storage medium stores the program that causes at least one processor to execute a process of: determining whether a route to a destination passes through an unupdated area that requires an update of map data when the route has been searched in a state where the automated driving function causes the subject vehicle to be traveling with the autonomous traveling control using the map data; and providing notification indicating an existence of the unupdated area when the route passes through the unupdated area.

In these example embodiments, when a route passing through an unupdated area requiring update of the three-dimensional map data is searched, the presence of the unupdated area is notified. Therefore, the driver can recognize that the information necessary to continue the autonomous travel control is insufficient and there is a risk to interrupt the autonomous travel control. As described above, since the possibility of the state change of the autonomous driving is indicated in advance, the convenience of the autonomous driving related to the route setting is easily secured.

Hereinafter, a plurality of embodiments will be described with reference to the drawings.

First Embodiment

Figure 2:
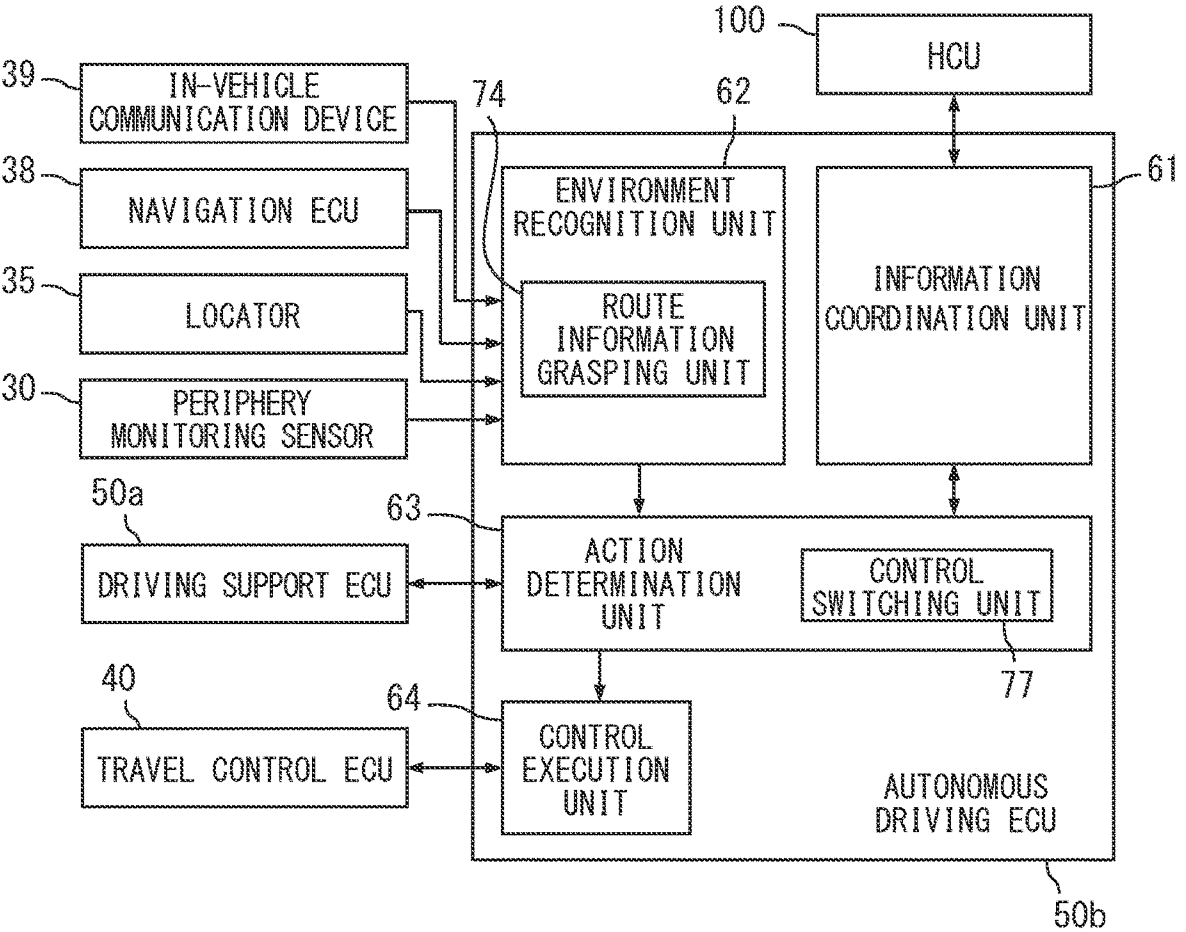
FIG. 2 is a block diagram showing details of the autonomous driving ECU.
Figure 3:
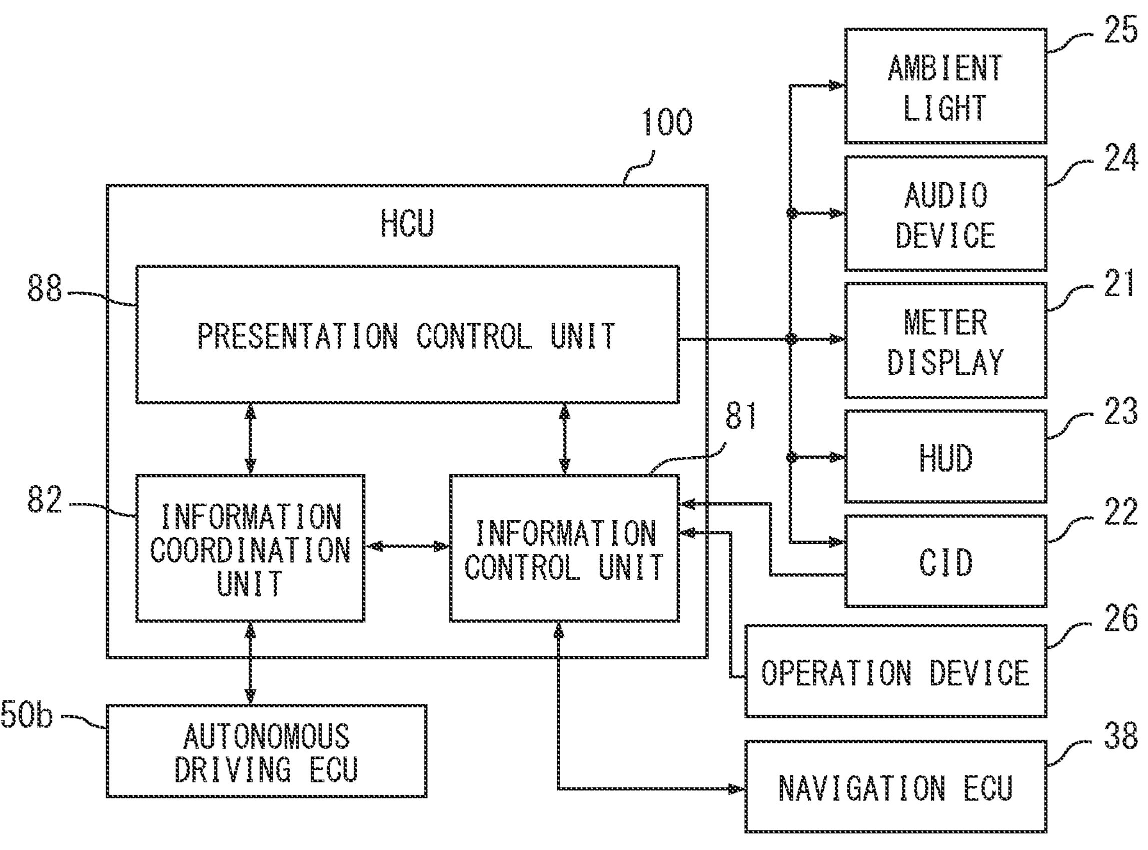
FIG. 3 is a block diagram showing details of the HCU.

A human machine interface control unit (HCU) according to a first embodiment of the present disclosure shown in FIGS. 1 to 3 is an interface control device used in a vehicle (hereinafter, referred to as subject vehicle Am). The HCU 100 constitutes a human machine interface (HMI) system 10 of the subject vehicle Am together with multiple input and output devices and the like. The HMI system 10 has an input interface function of receiving an operation of an occupant such as a driver of the subject vehicle Am, and an output interface function of presenting information to the driver or the like.

The HCU 100 is communicably connected to a communication bus 99 of an in-vehicle network 1 mounted on the subject vehicle Am. The HCU 100 is one of multiple nodes provided in the in-vehicle network 1. A periphery monitoring sensor 30, a locator 35, a navigation electronic control unit (ECU) 38, an in-vehicle communication device 39, a travel control ECU 40, and the like are connected to a communication bus 99 of the in-vehicle network 1. In addition, a driving support ECU 50*a*, an autonomous driving ECU 50*b*, and the like are connected to the communication bus 99 of the in-vehicle network 1. These nodes connected to the communication bus 99 can communicate with one another. Specific nodes among the devices, the ECUs, and the like may be directly electrically connected to one another, and may communicate with one another without the communication bus 99.

The periphery monitoring sensor 30 is an autonomous sensor that monitors a surrounding environment of the subject vehicle Am. The periphery monitoring sensor 30 includes, for example, one or multiple camera units 31, millimeter wave radars 32, lidars 33, and sonars 34. The periphery monitoring sensor 30 can detect a moving object and a stationary object from a detection range around the subject vehicle. The periphery monitoring sensor 30 provides detection information on an object around the subject vehicle to the driving support ECU 50*a*, the autonomous driving ECU 50*b*, and the like.

The locator 35 includes a global navigation satellite system (GNSS) receiver, an inertial sensor, and the like. The locator 35 combines positioning signals received from multiple positioning satellites by the GNSS receiver, a measurement result of the inertial sensor, vehicle speed information output to the communication bus 99, and the like, and sequentially measures a subject vehicle position, a traveling direction, and the like of the subject vehicle Am. The locator 35 sequentially outputs, as locator information, position information and direction information of the subject vehicle Am based on a positioning result to the communication bus 99.

The locator 35 further includes a map database (hereinafter, referred to as map DB) 36 that stores map data. The map DB 36 mainly includes a large capacity storage medium for storing a large number of pieces of three-dimensional map data and two-dimensional map data. The three-dimensional map data is so-called high definition (HD) map data and high accuracy map data, and includes road information necessary for autonomous driving. Specifically, three-dimensional shape information of roads, detailed information of each lane, and the like are included in the three-dimensional map data. The locator 35 can update the three-dimensional map data and the two-dimensional map data to the latest information by external communication using the in-vehicle communication device 39. The locator 35 reads map data on a periphery of a current position from the map DB 36, and provides the map data to the driving support ECU 50*a*, the autonomous driving ECU 50*b*, and the like together with the locator information.

The navigation ECU 38 acquires information on a destination designated by an occupant such as a driver based on operation information acquired from the HCU 100. The navigation ECU 38 acquires the position information and the direction information of the subject vehicle from the locator 35 and sets a route from the current position to the destination. The navigation ECU 38 provides route information indicating a set route to the destination to the driving support ECU 50*a*, the autonomous driving ECU 50*b*, the HCU 100, and the like. The navigation ECU 38 cooperates with the HMI system 10, combines screen display, voice messages, and the like as route guidance to the destination, and notifies the driver of the traveling direction of the subject vehicle Am at an intersection, a branch point, and the like.

Here, a user terminal such as a smartphone may be connected to the in-vehicle network 1 or the HCU 100. Such a user terminal may provide subject vehicle position information, the direction information, map data, and the like to the driving support ECU 50*a*, the autonomous driving ECU 50*b*, and the like instead of the locator 35. Further, the user terminal may provide the route information to the destination to the driving support ECU 50*a*, the autonomous driving ECU 50*b*, the HCU 100, and the like instead of the navigation ECU 38.

The in-vehicle communication device 39 is an external communication unit mounted on the subject vehicle Am and functions as a vehicle to everything (V2X) communication device. The in-vehicle communication device 39 transmits and receives information by wireless communication to and from a roadside device provided beside the road. As an example, the in-vehicle communication device 39 receives congestion information on the periphery of the current position and the traveling direction of the subject vehicle Am and road construction information from the roadside device. The congestion information and the road construction information is, for example, VICS (registered trademark) information. The in-vehicle communication device 39 provides the received congestion information and the road construction information to the autonomous driving ECU 50*b*, the HCU 100, and the like.

The travel control ECU 40 is an electronic control device mainly including a microcontroller. The travel control ECU 40 has at least functions of a brake control ECU, a drive control ECU, and a steering control ECU. The travel control ECU 40 continuously implements braking force control of each wheel, output control of an in-vehicle power source, and steering angle control based on any one of an operation command based on an driving operation of the driver, a control command of the driving support ECU 50*a*, and a control command of the autonomous driving ECU 50*b*.

The driving support ECU 50*a* and the autonomous driving ECU 50*b* constitute an autonomous driving system 50 of the subject vehicle Am. By mounting the autonomous driving system 50, the subject vehicle Am becomes an autonomous vehicle having an automated driving function and is capable of traveling by the automated driving function.

The driving support ECU 50*a* in the autonomous driving system 50 implements a driving support function for supporting a driving operation of a driver. The driving support ECU 50*a* enables partial automated driving control or advanced driving support of about Level 2 of an autonomous driving level defined by the Society of Automotive Engineers. Autonomous driving implemented by the driving support ECU 50*a* is autonomous driving in which the driver has a periphery monitoring obligation and needs to monitor the periphery of the subject vehicle by visual observation.

The autonomous driving ECU 50*b* is capable of performing driving operations for the driver, and is capable of implementing Level 3 or higher of autonomous travel, in which the system is a control main body, of the autonomous driving level defined by the Society of Automotive Engineers. The autonomous driving implemented by the autonomous driving ECU 50*b* is autonomous driving that does not require monitoring the periphery of the subject vehicle, that is, eyes-off autonomous driving in which the driver has no periphery monitoring obligation.

In the above autonomous driving system 50, a traveling control state of the automated driving function is switched between multiple controls including at least automated driving control with the periphery monitoring obligation performed by the driving support ECU 50*a* and automated driving control with no periphery monitoring obligation performed by the autonomous driving ECU 50*b*. In the following description, the automated driving control of Level 2 or lower performed by the driving support ECU 50*a* is referred to as "driving support control", and the automated driving control of Level 3 or higher performed by the autonomous driving ECU 50*b* is referred to as "autonomous travel control".

In an autonomous driving period in which the subject vehicle Am travels under the autonomous travel control, the driver can be permitted to perform a specific action (hereinafter, referred to as a second task) other than predetermined driving. The second task is permitted under regulation by the driver until an implementation request of a driving operation by cooperation between the autonomous driving ECU 50*b* and the HCU 100, that is, a request for a driving takeover occurs. For example, actions such as viewing entertainment contents such as video contents, operating a device such as a smartphone, and having a meal are assumed as the second task.

The driving support ECU 50*a* is a computer mainly including a control circuit. The control circuit includes a processing unit, a RAM, a storage unit, an input and output interface, a bus connecting these units, and the like. The driving support ECU 50*a* implements the driving support functions such as adaptive cruise control (ACC) and lane trace control (LTC) by the processing unit executing programs. The driving support ECU 50*a* implements the driving support control for causing the subject vehicle Am to travel along a subject vehicle lane in which the subject vehicle Am is traveling by cooperation of functions of the ACC and the LTC. In addition, the driving support ECU 50*a* provides control status information indicating a state of the driving support control to the autonomous driving ECU 50*b*.

The autonomous driving ECU 50*b* has a greater arithmetic capacity than the driving support ECU 50*a*, and can implement at least travel control corresponding to the ACC and the LTC. In a scene in which the autonomous travel control is temporarily interrupted, and the like, the autonomous driving ECU 50*b* may implement the driving support control with the periphery monitoring obligation by the driver, instead of the driving support ECU 50*a*. The autonomous driving ECU 50*b* is a computer mainly including a control circuit. The control circuit includes a processing unit 51, a RAM 52, a storage unit 53, an input and output interface 54, a bus connects these units, and the like. The processing unit 51 executes various processes for implementing an automated driving control method according to the present disclosure by accessing the RAM 52. The storage unit 53 stores various programs (such as an automated driving control program) to be executed by the processing unit 51. By the execution of the programs by the processing unit 51, an information coordination unit 61, an environment recognition unit 62, an action determination unit 63, a control execution unit 64, and the like are constructed in the autonomous driving ECU 50*b* as multiple functional units for implementing the automated driving function (see FIG. 2).

The information coordination unit 61 provides information to an information coordination unit 82 of the HCU 100 and acquires information from the information coordination unit 82. By the coordination of the information coordination units 61 and 82, the autonomous driving ECU 50*b* and the HCU 100 share the respective acquired information. The information coordination unit 61 generates control status information indicating an operation state of the automated driving function and provides the generated control status information to the information coordination unit 82. In addition, the information coordination unit 61 enables the HCU 100 to perform notification in synchronization with the operation state of the automated driving function, by outputting a notification implementation request to the information coordination unit 82. Meanwhile, the information coordination unit 61 acquires operation information of the driver and the like from the information coordination unit 82. The information coordination unit 61 grasps contents of a user operation input to the HMI system 10 or the like, based on the operation information.

The environment recognition unit 62 combines the locator information acquired from the locator 35 and the detection information acquired from the periphery monitoring sensor 30, and recognizes a traveling environment of the subject vehicle Am. Specifically, the environment recognition unit 62 grasps information related to a road on which the subject vehicle Am travels, a relative position and a relative speed of a moving object (other vehicles or the like) around the subject vehicle, and the like. In addition, the environment recognition unit 62 acquires vehicle information indicating a state of the subject vehicle Am from the communication bus 99. As an example, the environment recognition unit 62 acquires vehicle speed information indicating a current traveling speed of the subject vehicle Am.

The environment recognition unit 62 recognizes traffic congestion around the subject vehicle Am by combining information on other vehicles around the subject vehicle, the vehicle speed information, and the like. When the current traveling speed of the subject vehicle Am is equal to or lower than a traffic congestion speed (for example, about 30 km/h) and there are preceding vehicles and following vehicles traveling in the same lane as the subject vehicle, the environment recognition unit 62 determines that the periphery of the subject vehicle are in a traffic congestion state.

The environment recognition unit 62 determines whether the road on which the subject vehicle Am travels or a road on which the subject vehicle Am is scheduled to travel is an autonomous-driving-allowed area (hereinafter, referred to as an AD area) or a restricted AD area set in advance. Information indicating whether the road is the AD area or the restricted AD area may be recorded in the map data stored in the map DB 36 or may be included in reception information received by the in-vehicle communication device 39.

The AD area and the restricted AD area can correspond to an operational design domain in which the autonomous driving with no periphery monitoring obligation by the driver is permitted under regulation. The autonomous driving with no periphery monitoring obligation includes, as multiple control modes, traffic congestion limitation control (hereinafter, referred to as congested time Level 3) implemented only for traveling during traffic congestion and area limitation control (hereinafter, referred to as area Level 3) implemented only for traveling in a specific area (AD area). On a road in the AD area, implementation of both the congested time Level 3 and area Level 3 are permitted, and implementation of only the congested time Level 3 is permitted on a road in the restricted AD area. In a manual driving area (hereinafter, referred to as an MD area) that is not included in either the AD area or the restricted AD area, traveling under the autonomous travel control of Level 3 is basically prohibited. In the MD area, traveling in autonomous driving of Level 2 or higher may be prohibited. The AD area or the restricted AD area is set to, for example, an expressway including a motorway.

The action determination unit 63 coordinates the driving support ECU 50*a* and the HCU 100 to control the driving takeover between the autonomous driving system 50 and the driver. In addition, when the autonomous driving ECU 50*b* has a control right of the driving operation, the action determination unit 63 generates a scheduled traveling line, along which the subject vehicle Am travels, based on a recognition result of the traveling environment obtained by the environment recognition unit 62, and outputs the generated scheduled traveling line to the control execution unit 64.

The action determination unit 63 includes a control switching unit 77 as a sub-function unit for controlling the operation state of the automated driving function. The control switching unit 77 coordinates the driving support ECU 50*a* and switches between the driving support control with the periphery monitoring obligation by the driver and the autonomous travel control with no periphery monitoring obligation by the driver. In addition, when the subject vehicle Am travels under the autonomous travel control, the control switching unit 77 switches the control mode of the autonomous travel control between multiple control modes including the congested time Level 3 and the area Level 3.

When the autonomous driving ECU 50*b* has the control right of the driving operation, the control execution unit 64 executes, in coordination with the travel control ECU 40, acceleration and deceleration control, steering control, and the like of the subject vehicle Am in accordance with the scheduled traveling line generated by the action determination unit 63. Specifically, the control execution unit 64 generates control commands based on the scheduled traveling line, and sequentially outputs the generated control commands to the travel control ECU 40.

Details of each of multiple display devices, an audio device 24, an ambient light 25, an operation device 26, and the HCU 100 included in the HMI system 10 will be described in order.

The display device presents information through the visual sense of the driver by image display or the like. The display device includes a meter display 21, a center information display (hereinafter referred to as CID) 22, a head-up display (hereinafter referred to as HUD) 23, and the like. The CID 22 has a function of a touch panel, and detects a touch operation on a display screen performed by the driver or the like.

The audio device 24 includes multiple speakers provided in a vehicle interior in a manner of surrounding a driver's seat, and causes the speakers to reproduce a notification sound, a voice message, or the like in the vehicle interior. The ambient light 25 is provided on an instrument panel, a steering wheel, and the like. The ambient light 25 presents information using a peripheral visual field of the driver by ambient display that changes an emission color.

The operation device 26 is an input unit that receives a user operation performed by the driver or the like. For example, a user operation related to activation and stop of the automated driving function and a user operation related to a setting of a destination of route guidance are input to the operation device 26. The operation device 26 includes a steering switch provided on a spoke portion of the steering wheel, an operation lever provided on a steering column portion, a voice input device for recognizing utterance contents of the driver, and the like.

The HCU 100 is an information presentation device that integrally controls information presentation using the multiple display devices, the audio device 24, and the ambient light 25. The HCU 100 controls presentation of information related to the autonomous driving in coordination with the autonomous driving system 50. The HCU 100 is a computer mainly including a control circuit. The control circuit includes a processing unit 11, a RAM 12, a storage unit 13, an input and output interface 14, a bus connecting these units, and the like. The processing unit 11 executes various processes for presentation control processing by accessing the RAM 12. The RAM 12 may include a video RAM for generating image data. The storage unit 13 includes a non-volatile storage medium. The storage unit 13 stores various programs (such as a presentation control program) to be executed by the processing unit 11. The HCU 100 constructs multiple functional units by the processing unit 11 executing the programs stored in the storage unit 13. Functional units such as an information control unit 81, an information coordination unit 82, and a presentation control unit 88 are constructed in the HCU 100 (see FIG. 3).

The information control unit 81 acquires operation information indicating contents of a user operation from the CID 22, the operation device 26, and the like. The information control unit 81 provides operation information on a user operation related to the automated driving function to the information coordination unit 82. The information control unit 81 provides operation information on a user operation for setting a destination of the subject vehicle Am to the navigation ECU 38. In addition, the information control unit 81 acquires route information to the destination, a guidance image based on the map data, a guidance implementation request, and the like from the navigation ECU 38, and provides the route information, the guidance image, the guidance implementation request, and the like to the presentation control unit 88. The information control unit 81 coordinates the navigation ECU 38 and enables the route guidance performed by the HMI system 10.

The information coordination unit 82 coordinates the autonomous driving ECU 50*b* and enables sharing of information between the autonomous driving system 50 and the HCU 100. The information coordination unit 82 provides the operation information grasped by the information control unit 81 to the autonomous driving ECU 50*b*. In addition, the information coordination unit 82 acquires an implementation request of information presentation related to the automated driving function and control status information indicating a state of the automated driving function from the autonomous driving ECU 50*b*.

The information coordination unit 82 grasps the operation state of the autonomous driving by the autonomous driving system 50 based on the control status information. Specifically, the information coordination unit 82 grasps whether the travel control being implemented is the driving support control or the autonomous travel control, that is, grasps whether the autonomous travel control with no periphery monitoring obligation by the driver is executed by the automated driving function. When the subject vehicle Am travels in a state with no periphery monitoring obligation by the driver, the information coordination unit 82 further grasps the control mode of the autonomous travel control.

The presentation control unit 88 integrally provides information to the driver using the display devices, the audio device 24, the ambient light 25, and the like. As an example, the presentation control unit 88 implements guidance of a route toward the destination based on the route information, the guidance image, and the like acquired by the information control unit 81. Further, the presentation control unit 88 implements contents provision and information presentation in accordance with the operation state of the autonomous driving, based on the control status information and the implementation request acquired by the information coordination unit 82. When the implementation of the autonomous travel control in an eyes-off state is grasped by the information coordination unit 82, the presentation control unit 88 enables reproduction of the video contents and the like. In addition, the presentation control unit 88 requests a driving takeover to the driver based on the implementation request acquired by the information coordination unit 82.

Figure 4:
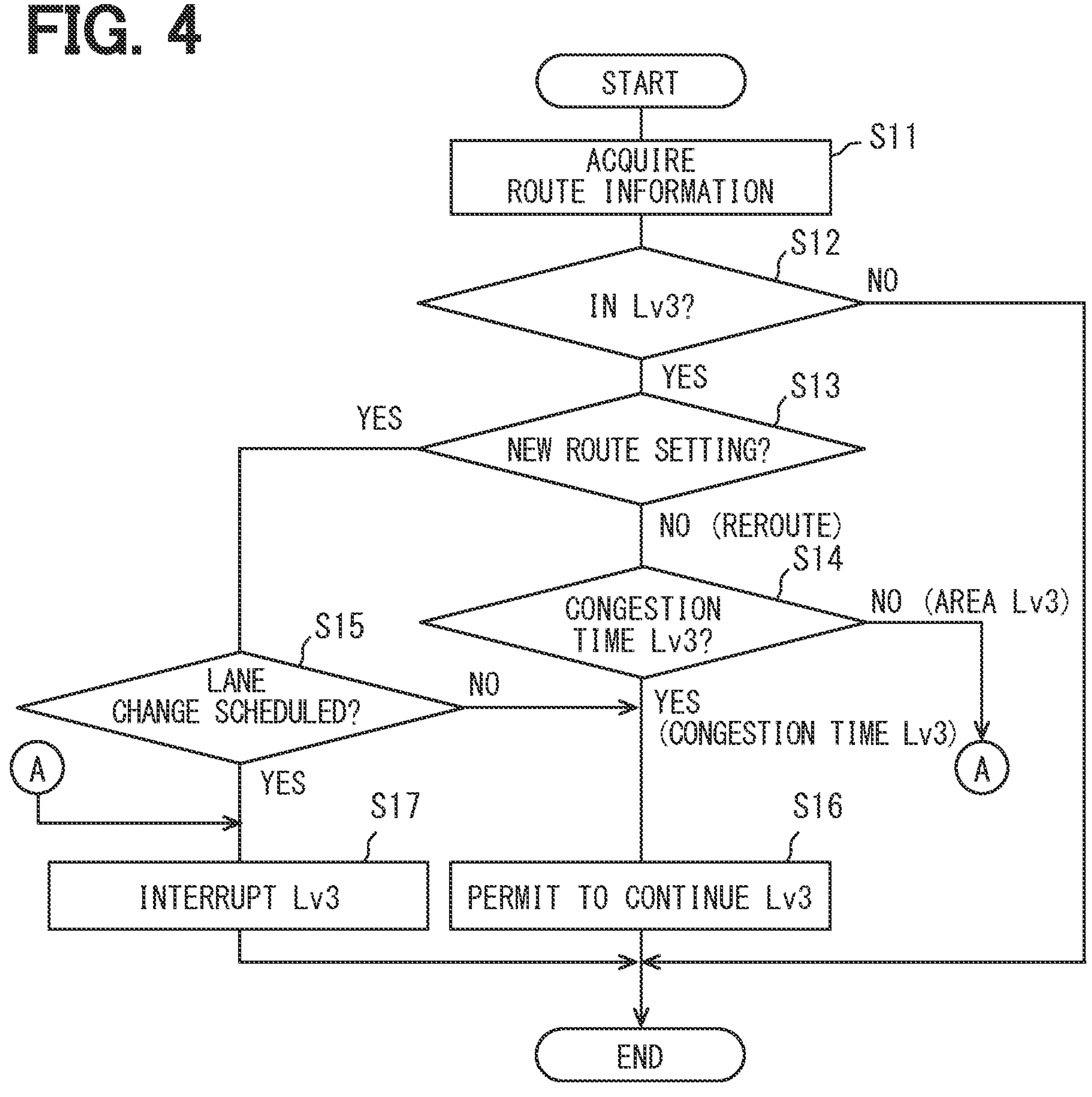
FIG. 4 is a flowchart showing details of a continuation determination process of autonomous driving implemented by the autonomous driving ECU.

When the route setting of the navigation ECU 38 is performed during the period in which the subject vehicle Am travels under the autonomous travel control, the autonomous driving ECU 50*b* described above determines whether to continue the autonomous driving with no periphery monitoring obligation based on a continuation determination process (see FIG. 4). Hereinafter, details of a function related to a determination of whether to continue the autonomous driving according to the route setting will be described.

The environment recognition unit 62 includes a route information grasping unit 74 as a sub-function unit for implementing coordination between the navigation ECU 38 and the autonomous driving ECU 50*b*. The route information grasping unit 74 acquires the route information from the navigation ECU 38. The route information grasping unit 74 grasps whether a route to the destination is set in the navigation ECU 38 of the subject vehicle Am based on the route information.

In addition, the route information grasping unit 74 grasps a change of the route to the destination set in the navigation ECU 38 based on the route information. The route change occurs when a destination is changed by the driver or the like, when a stopover is added, when a route search condition is changed, or the like. Further, even when the navigation ECU 38 searches for a new route that allows the vehicle to arrive at the destination earlier based on the congestion information, the road construction information, and the like acquired by the in-vehicle communication device 39, the route change is implemented. When such a route change occurs, the route information grasping unit 74 further grasps whether the route change is a route change accompanied by a change of the destination, and whether the route change is a route change performed by a driver's operation or a route change based on a proposal of the navigation ECU 38. The route information grasping unit 74 may grasp that the destination set in the navigation ECU 38 is deleted based on the route information.

When the route setting in the navigation ECU 38 is grasped by the route information grasping unit 74 during the implementation of the autonomous driving with no periphery monitoring obligation, the control switching unit 77 determines whether to permit the continuation of the autonomous driving with no periphery monitoring obligation even after the route is set. In addition, when the route change in the navigation ECU 38 is grasped by the route information grasping unit 74 during the implementation of the autonomous driving with no periphery monitoring obligation, the control switching unit 77 determines whether to permit the continuation of the autonomous driving with no periphery monitoring obligation even after the route is changed.

More specifically, when the newly set route or the changed route is grasped by the route information grasping unit 74, the action determination unit 63 updates the scheduled traveling line on which the subject vehicle Am travels based on the grasped route, that is, the latest route set in the navigation ECU 38. The control switching unit 77 refers to the updated scheduled traveling line, and determines whether the autonomous driving with no periphery monitoring obligation, that is, the autonomous travel control can be continued. As an example, when a scheduled traveling line for performing a lane change is generated, and the lane change of the subject vehicle Am is scheduled within a predetermined time or a predetermined distance after the route is set, the control switching unit 77 does not permit the continuation of the autonomous travel control.

Further, when the route is changed, the control switching unit 77 determines whether to permit the continuation of the autonomous travel control after the route is changed according to the control mode of the autonomous travel control being implemented. Specifically, when the control mode of the autonomous travel control being implemented is the congested time Level 3, the control switching unit 77 permits the continuation of the autonomous travel control even after the route is changed. On the other hand, when the control mode of the autonomous travel control being implemented is the area Level 3, the control switching unit 77 restricts the continuation of the autonomous travel control after the route is changed.

When the control switching unit 77 determines not to continue the autonomous travel control after the route is set or after the route is changed, the control switching unit 77 changes the state of the automated driving control, that is, the autonomous driving level. Specifically, the control switching unit 77 switches from the autonomous driving of Level 3 (autonomous travel control) to the autonomous driving of Level 2 or less, such as hands-off autonomous driving or hands-on autonomous driving (driving support control) or manual driving.

The action determination unit 63 generates a travel plan of the subject vehicle Am including a determination result of whether to continue the autonomous travel control after the route is set, a transition schedule of the control state when the autonomous travel control is not continued, and the like together with the scheduled traveling line. The travel plan generated by the action determination unit 63 is provided to the HCU 100 through the information coordination unit 61.

Details of the continuation determination process of determining whether to continue the autonomous travel control as described above will be further described based on FIG. 4 with reference to FIGS. 1 and 2. The continuation determination process is started by the autonomous driving ECU **50*b* based on a fact that the route information grasping unit 74 grasps that the navigation ECU 38** sets the route.

In S11 of the continuation determination process, the route information grasping unit 74 acquires the latest route information and grasps contents of the latest route set in the navigation ECU 38. In S12, the control switching unit 77 determines whether the autonomous driving of Level 3 (autonomous travel control) with no periphery monitoring obligation is implemented. When it is determined in S12 that the autonomous travel control is not implemented, the continuation determination process is ended. On the other hand, when it is determined in S12 that the autonomous travel control is implemented, the process proceeds to S13.

In S13, it is determined whether the current route setting of the navigation ECU 38 is a new route setting. The new route setting is a case where a destination and a route are newly set in a state where a route is not set, in other words, in a state where a destination is not set and route guidance is not performed. On the other hand, a route setting which is not new is a so-called reroute, and is a case where a destination or a route is changed in a state where the destination is set and the route guidance is performed. In S13, when the route information grasping unit 74 determines that the route is not the new route setting but the reroute, the process proceeds to S14.

In S14, the control mode of the autonomous travel control being implemented is determined. When it is determined in S14 that the congested time Level 3 is being implemented, the process proceeds to S16, the continuation of the autonomous driving of Level 3 is permitted, and the current continuation determination process ends. As described above, when the reroute is performed, if the congested time Level 3 is being implemented, the autonomous driving with no periphery monitoring obligation according to the congested time Level 3 is continued. Accordingly, it is possible to perform the reroute during the autonomous driving with no periphery monitoring obligation.

When it is determined in S14 that the area Level 3 is being implemented instead of the congested time Level 3, the process proceeds to S17, temporary interruption or cancellation of the autonomous driving of Level 3 is determined, and the current continuation determination process ends. As an example, in S17, it is determined to shift to the driving support control of the hands-on autonomous driving of Level 2. When the temporary shift to Level 2 is performed in S17, restoring to Level 3 may be performed after a predetermined time elapses or after the vehicle travels a predetermined distance. As described above, when the reroute is implemented, it is determined whether the continuation of the autonomous driving of Level 3 is permitted according to whether the autonomous driving is in the congested time Level 3 or the area Level 3.

On the other hand, in S13, when the route information grasping unit 74 determines that the route is the new route setting, the process proceeds to S15. In S15, whether to continue the autonomous driving with no periphery monitoring obligation is determined based on whether a lane change occurs after the route is set. When it is determined in S15 that the lane change is scheduled within the predetermined time or the predetermined distance after the route is set, the process proceeds to S17, and it is determined to interrupt the autonomous driving of Level 3. Also in S17 in this case, it is determined to shift to the driving support control of the hands-on autonomous driving of Level 2. On the other hand, when it is determined in S15 that no lane change is scheduled after the route is set, the process proceeds to S16, the continuation of the autonomous driving of Level 3 is permitted, and the current continuation determination process ends. As described above, it is possible to set a new route during the autonomous driving with no periphery monitoring obligation.

Here, even when the setting of the destination is cancelled, the autonomous driving ECU 50*b* may determine whether to continue the autonomous travel control according to the control mode of the autonomous travel control, similarly to the case where the route change is performed. Specifically, the autonomous travel control is continued even after the setting of the destination is cancelled when the congested time Level 3 is being implemented. On the other hand, when the area Level 3 is implemented, the temporary interruption or cancellation of the autonomous travel control is determined based on the cancellation of the setting of the destination.

As described above, when the setting or change of the route occurs during the implementation of the autonomous driving of Level 3, the driver may have a periphery monitoring obligation. Therefore, when a route is set in the navigation ECU 38, the HCU 100 notifies of the state of the automated driving control of the autonomous driving ECU 50*b* after the route is set. Hereinafter, details of the notification of the state of the automated driving control according to the route setting will be described.

When a route to a destination is set in the navigation ECU 38 in a state where the autonomous driving ECU 50*b* causes the subject vehicle Am to travel under the autonomous travel control, the information coordination unit 82 grasps the state of the automated driving control implemented after the route is set. Specifically, the information coordination unit 82 acquires the travel plan generated based on the determination result of whether to continue the autonomous travel control by the continuation determination process (see FIG. 4) from the autonomous driving ECU 50*b* as information indicating "the state of the automated driving control implemented after the route is set". When the autonomous travel control is ended by the autonomous driving ECU 50*b*, the information coordination unit 82 acquires the travel plan before the end of the autonomous travel control.

The information coordination unit 82 grasps the autonomous driving level of the automated driving control implemented after the route is set during a continuation period of the autonomous travel control based on the travel plan. Specifically, the information coordination unit 82 grasps whether the driving takeover to the driver is scheduled within a predetermined time or a predetermined distance after the route is set. In addition, when there is no schedule for the driving takeover and the traveling under the automated driving control is continued even after the route is set, the information coordination unit 82 further grasps whether the periphery monitoring by the driver is necessary, whether gripping the steering wheel is necessary, and the like.

Figure 6:
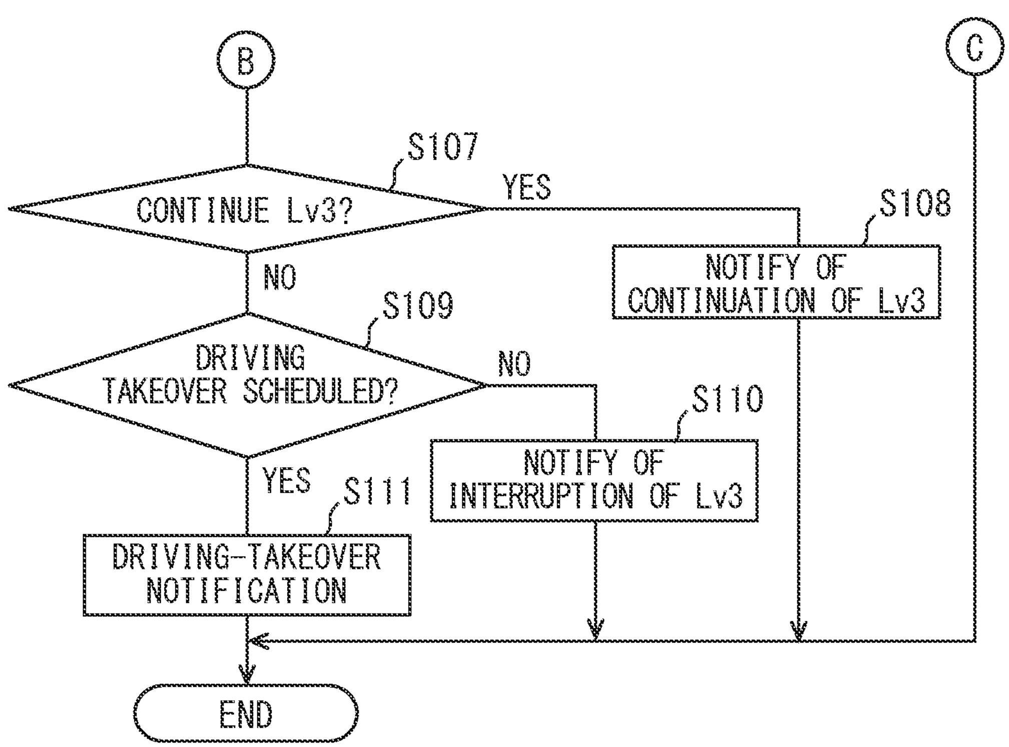
FIG. 6 is a flowchart showing details of the notification control process together with FIG. 5.

The presentation control unit 88 notifies of the state of the automated driving control implemented after the route is set. The presentation control unit 88 starts the notification of the state of the automated driving control (hereinafter, referred to as continuation possibility notification) before the state of the automated driving control is changed by the autonomous driving ECU 50*b*. The continuation possibility notification may be ended based on elapse of a predetermined time or may be ended based on completion of the state change of the automated driving control. The presentation control unit 88 implements Level-3-continuation notification (see S108 in FIG. 6), Level-3-interruption notification (see S110 in FIG. 6), driving-takeover notification (see S111 in FIG. 6), and the like as the continuation possibility notification.

The Level-3-continuation notification is a notification indicating the continuation of the autonomous travel control to the driver when the autonomous driving ECU 50*b* continues the autonomous travel control after the route is set. In the Level-3-continuation notification, a message such as "autonomous driving can be continued" is displayed on the meter display 21, the CID 22, or the like together with a message notifying of the completion of the route setting. In the Level-3-continuation notification, guidance by voice may not be implemented.

The Level-3-interruption notification is a notification indicating the interruption of the autonomous travel control and the state change of the automated driving control to the driver when the autonomous driving ECU 50*b* interrupts or cancels the autonomous travel control after the route is set. In the Level-3-interruption notification, a message such as "Please hold the steering wheel" or "Please check the periphery of the vehicle" is displayed on the meter display 21, the CID 22, or the like together with the message notifying of the completion of the route setting. In the Level-3-interruption notification, an alert may be implemented by voice.

The driving-takeover notification is a notification notifying the driver of the occurrence of the driving takeover when the driving takeover is scheduled after the route is set. The driving-takeover notification notifies the driver that the autonomous travel control is not continued and the control right of the driving operation is transferred to the driver. Specifically, in the driving-takeover notification, a message such as "autonomous driving will end soon" is displayed on the meter display 21, the CID 22, and the like, and is reproduced in the vehicle interior by the audio device 24.

Figure 5:
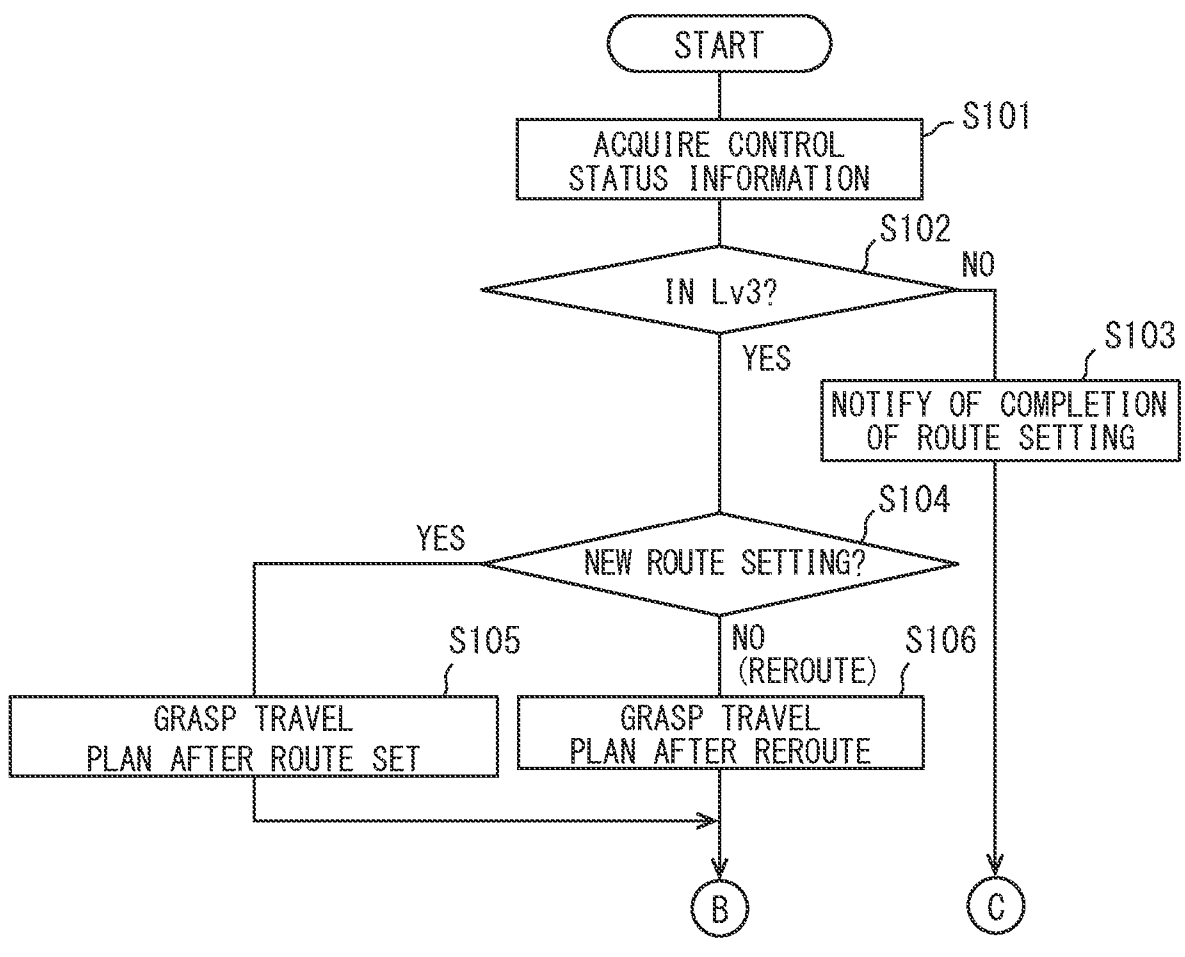
FIG. 5 is a flowchart showing details of a notification control process implemented by the HCU together with FIG. 6.

Next, details of a notification control process for implementing the continuation possibility notification described above will be further described based on FIGS. 5 and 6 with reference to FIGS. 1 to 3. The notification control process is started by the HCU 100 based on a fact that the information control unit 81 grasps that the navigation ECU 38 sets the route.

In S101 of the notification control process, the information coordination unit 82 acquires the control status information from the autonomous driving ECU 50*b*, and the process proceeds to S102. Based on the control status information acquired in S101, it is determined in S102 whether the autonomous driving of Level 3 (autonomous travel control) with no periphery monitoring obligation is implemented.

When it is determined in S102 that the autonomous travel control is not implemented, the process proceeds to S103. In S103, the presentation control unit 88 notifies of the completion of the route setting. Then, the current notification control process ends. On the other hand, when it is determined in S102 that the autonomous travel control is being implemented, the process proceeds to S104.

In S104, it is determined whether the current route setting of the navigation ECU 38 is a new route setting. When it is determined in S104 that the current route setting is the new route setting, the process proceeds to S105, and the travel plan of the subject vehicle Am after the route is set is grasped. When it is determined in S104 that the current route setting is not a new route setting but a reroute, the process proceeds to S106, and the travel plan of the subject vehicle Am after the reroute is grasped.

In S107, the travel plan grasped in S105 or S106 is referred to, and it is determined whether the autonomous driving of Level 3 (autonomous travel control) is continued even after the route is set. When it is determined in S107 that the autonomous travel control is continued, the process proceeds to S108. In S108, the presentation control unit 88 implements the Level-3-continuation notification and notifies the driver of the continuation of the autonomous travel control. Accordingly, the current notification control process is ended.

On the other hand, when it is determined in S107 that the autonomous travel control is not continued, the process proceeds to S109. In the processing of S109 and thereafter, a notification notifying that the autonomous driving level is changed is implemented. Specifically, in S109, the travel plan grasped in S105 or S106 is referred to, and it is determined whether a driving takeover is scheduled within a predetermined time after the route is set. When it is determined in S109 that a driving takeover is not scheduled, the process proceeds to S110. In S110, the presentation control unit 88 implements the Level-3-interruption notification, and notifies the driver of the autonomous driving level of the automated driving control to be implemented after the route is set. Accordingly, the current notification control process is ended.

On the other hand, when it is determined in S109 that a driving takeover is scheduled, the process proceeds to S111. In S111, the presentation control unit 88 implements the driving-takeover notification and requests the driver to implement the driving takeover after the route is set. Further, the presentation control unit 88 implements the notification for the driving takeover in accordance with the end of the autonomous travel control in the autonomous driving ECU 50*b*. Accordingly, the current notification control process is ended.

In the first embodiment described above, when the route to the destination is set in the subject vehicle Am traveling under the autonomous travel control, the state of the automated driving control implemented by the autonomous driving system 50 after the route is set, that is, the autonomous driving level is notified. Therefore, when the autonomous travel control with no periphery monitoring obligation is ended according to the route setting, the driver can grasp the end of the autonomous travel control in advance. Accordingly, it is possible to ensure the convenience of the autonomous driving related to the route setting.

In addition, in the first embodiment, when a new route is set in the subject vehicle Am traveling under the autonomous travel control in a state in which the route to the destination is not set, the state of the automated driving control after the route is set is notified. When the route is newly set, the autonomous driving level is more likely to decrease after the route is set as compared with when the route is reset (reroute). Therefore, the continuation possibility notification when the destination is newly set from an unset state is particularly effective for the driver to grasp the control state of the autonomous driving.

In the first embodiment, when the autonomous travel control is continued after the route is set, the continuation of the autonomous travel control is notified. In this manner, when the continuation of the autonomous travel control is notified, the driver can continue the travel under the autonomous travel control with peace of mind even after the route is set. As a result, the convenience of the autonomous driving can be further ensured.

Further, in the first embodiment, when the autonomous travel control is not continued after the route is set, the change of the automated driving control, that is, the decrease of the autonomous driving level is notified. In this manner, when the change of the automated driving control is notified, the driver can start the periphery monitoring, gripping the steering wheel, and the like with a margin. Accordingly, even in a scene in which the autonomous travel control is interrupted due to the route setting, the convenience of the autonomous driving is less likely to be impaired.

In addition, in the first embodiment, when it is grasped that a driving takeover is scheduled within a predetermined time or a predetermined distance after the route is set, the driver is notified of the occurrence of the driving takeover. In this manner, when the occurrence of the driving takeover is notified, the driver can restart the driving operation with a margin. As a result, even when the automated driving control is ended due to the route setting, the convenience of the autonomous driving is less likely to be impaired.

In addition, in the first embodiment, when it is grasped that a lane change is scheduled within a predetermined time or a predetermined distance after the route is set, the driver is notified of the interruption of the autonomous travel control. The lane change while the autonomous travel control is continued may not be permitted under regulation. Therefore, if the interruption of the autonomous travel control is notified based on the grasp of the schedule of the lane change, the driver can smoothly start the periphery monitoring or the like before the lane change is started. As a result, even the autonomous travel control is interrupted due to the route setting, the convenience of the autonomous driving is less likely to be impaired.

Further, in the first embodiment, when the route to the destination set in the navigation ECU 38 is changed, it is determined whether to permit the continuation of the autonomous travel control after the route is changed, according to the control mode of the autonomous travel control being implemented. Therefore, in the case of the control mode in which the autonomous travel control can be continued even after the route is changed, the traveling in the state with no periphery monitoring obligation by the driver can be continued. As described above, if the continuation of the autonomous travel control is permitted even after the route is changed, the convenience of the autonomous driving related to the route setting can be ensured.

In addition, in the first embodiment, when the autonomous travel control being implemented is at the congested time Level 3 in which the autonomous travel control is implemented only for the travel under congestion, the continuation of the autonomous travel control even after the route is changed is permitted. In this manner, when the subject vehicle Am or the like travels under congestion, since the traveling speed of the subject vehicle Am or the like is low, the continuation of the traveling under autonomous travel control may be permitted. As described above, since a period in which the autonomous travel control can be used is increased, the convenience of the autonomous driving is easily secured.

In addition, in the first embodiment, when the autonomous travel control being implemented is at the area Level 3 in which the autonomous travel control is implemented in the AD area, the continuation of the autonomous travel control after the route is changed is restricted. As described above, during the implementation of the area Level 3, the traveling speed of the subject vehicle Am or the like tends to increase. Therefore, it is desirable that the continuation of the autonomous travel control during the implementation of the area Level 3 be restricted.

In the first embodiment, the control switching unit 77 corresponds to a "continuation determination unit", the information coordination unit 82 corresponds to a "control grasping unit", and the presentation control unit 88 corresponds to a "notification control unit". Further, the HCU 100 corresponds to a "presentation control device", and the autonomous driving ECU 50*b* corresponds to the "automated driving control device".

Second Embodiment

Figure 7:
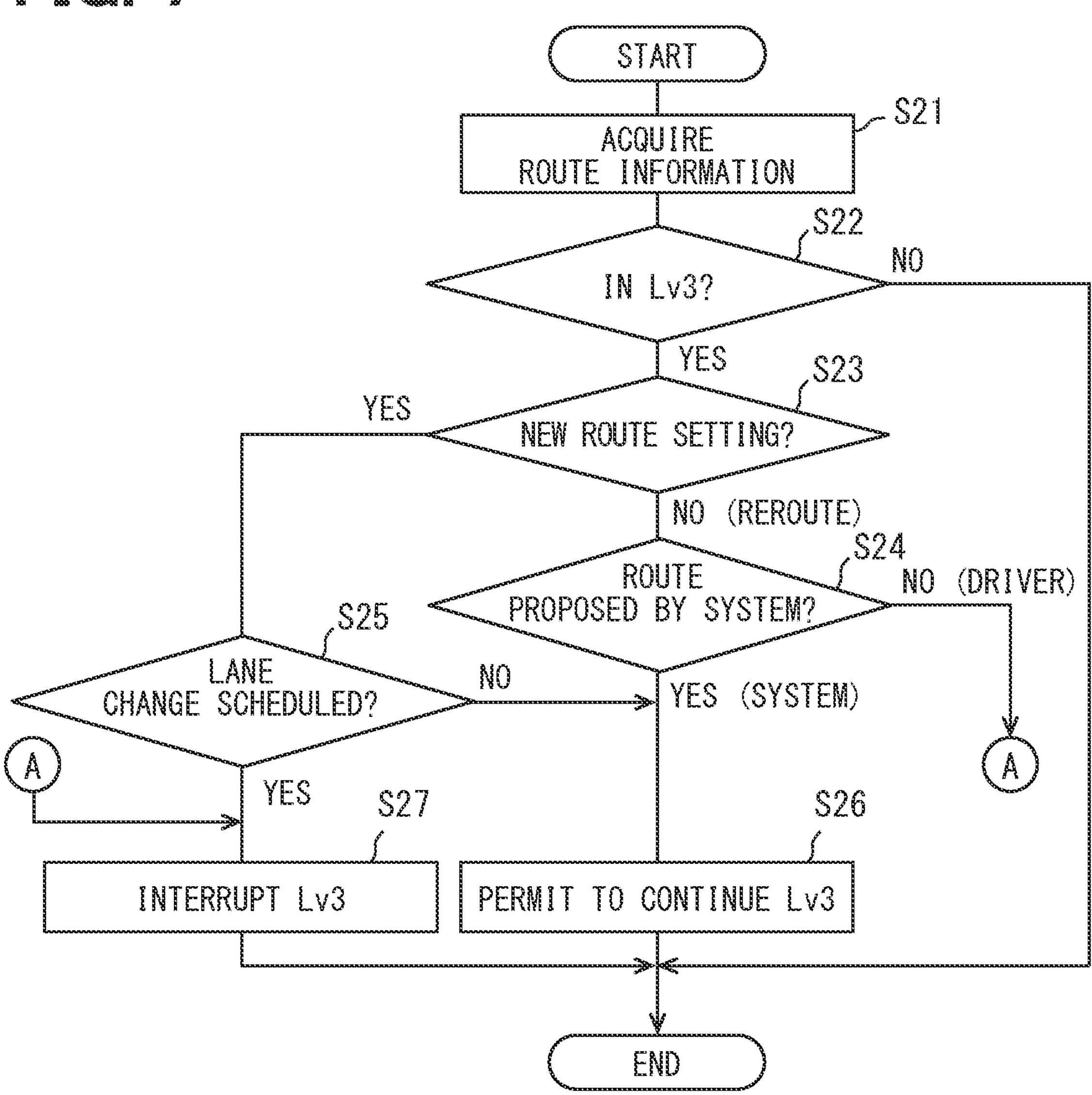
FIG. 7 is a flowchart showing details of a continuation determination process according to a second embodiment.

A second embodiment according the present disclosure is a modification of the first embodiment. When the route set in the navigation ECU 38 is changed, the autonomous driving ECU 50*b* according to the second embodiment determines whether to continue the autonomous travel control after a route change based on whether the route change is a route change of a system proposal. Hereinafter, details of the continuation determination process according to the second embodiment will be described based on FIG. 7 with reference to FIGS. 1 to 3. Since S21 to S23 and S25 of the continuation determination process are substantially the same as S11 to S13 and S15 (see FIG. 4) of the first embodiment, the description thereof will be omitted.

In S24, when it is determined in S23 of the continuation determination process that the current route setting is a reroute, the route information grasping unit 74 determines whether the current route change is a route change of a system proposal. When the route change is based on the fact that the route newly searched for by the navigation ECU 38 is approved by the driver, it is determined in S24 that the route change is the route change of the system proposal. In this case, the process proceeds to S26, the continuation of the autonomous driving of Level 3 is permitted, and the current continuation determination process ends. When the route change is the route change of the system proposal and the continuation of the autonomous driving of Level 3 is permitted, the presentation control unit 88 may omit the Level-3-continuation notification (see S108 in FIG. 6).

Here, the navigation ECU 38 preferentially searches for a route in which no lane change occurs within a predetermined time or a predetermined distance from a current position. The navigation ECU 38 may implement a proposal of the route change only when the navigation ECU 38 finds a route without an immediate lane change. In addition, the control switching unit 77 of the HCU 100 may select, as a route to be proposed to the driver, the route without an immediate lane change among multiple candidate routes searched by the navigation ECU 38.

The system of the subject vehicle Am that proposes the route change is not limited to the navigation ECU 38. For example, a user terminal connected to the in-vehicle network 1 may propose an optimal route as with the navigation ECU 38. Further, an energy manager of the subject vehicle Am may newly propose a route with less energy consumption in consideration of a decrease in a remaining fuel level or a remaining battery charge.

On the other hand, when the route change is a route change based on a change of the destination, an addition of a stopover, and a change of a route search condition by the occupant (driver or the like) of the subject vehicle Am, it is determined in S24 that the route change is not the route change of the system proposal but a route change caused by the driver. In this case, the process proceeds to S27, the temporary interruption or cancellation of the autonomous driving of Level 3 and the shift to the driving support control of the hands-on autonomous driving of Level 2 are determined, and the current continuation determination process is ended.

In the second embodiment described above, the same effects as those of the first embodiment can also be achieved, and the convenience of the autonomous driving related to the route setting can be ensured. Specifically, in the second embodiment, when the route is changed by an input of the occupant such as the driver in a state where the subject vehicle Am travels under the autonomous travel control, the continuation of the autonomous travel control after the route is changed is restricted. On the other hand, when the route is changed by the system of the subject vehicle Am such as the navigation ECU 38, the continuation of the autonomous travel control after the route is changed is permitted. According to the above, it is possible to avoid a situation in which the periphery monitoring obligation by the driver suddenly occurs due to an automatic change of the route by the system. Accordingly, it is possible to ensure the convenience of the autonomous driving related to the route setting.

In the second embodiment, the navigation ECU 38 corresponds to the "system" of the subject vehicle Am.

Third Embodiment

Figure 8:
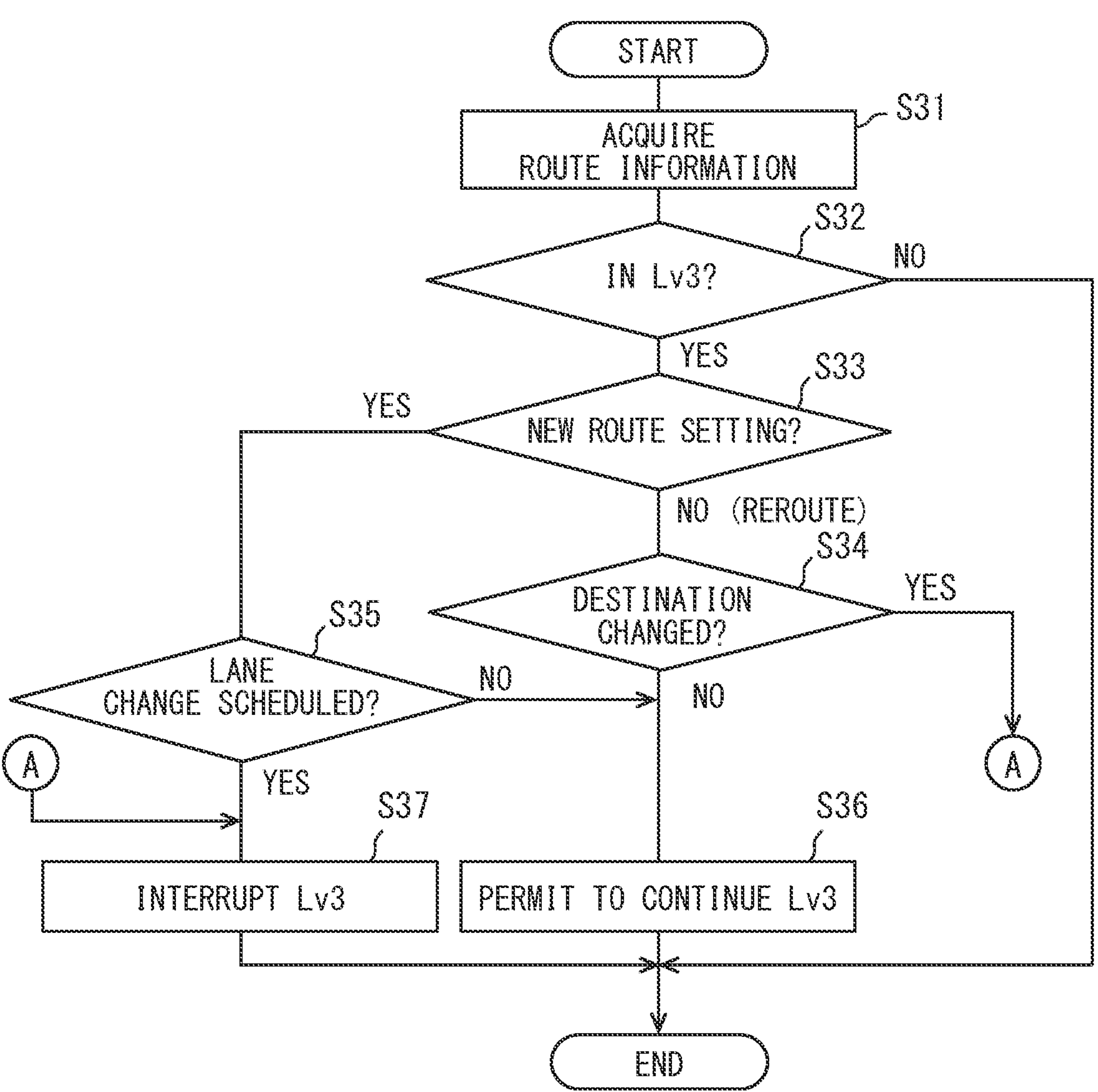
FIG. 8 is a flowchart showing details of a continuation determination process according to a third embodiment.

A third embodiment of the present disclosure is another modification of the first embodiment. When the route set in the navigation ECU 38 is changed, the autonomous driving ECU 50*b* according to the third embodiment determines whether to continue the autonomous travel control after a route change based on whether the route change is a route change due to a change of a destination. Hereinafter, details of the continuation determination process according to the third embodiment will be described based on FIG. 8 with reference to FIGS. 1 to 3. Since S31 to S33 and S35 of the continuation determination process are substantially the same as S11 to S13 and S15 (see FIG. 4) of the first embodiment, the description thereof will be omitted.

In S34 when it is determined in S33 of the continuation determination process that the current route setting is a reroute, the route information grasping unit 74 determines whether the destination in the current route change is changed. When it is determined in S34 that the destination is not changed, the process proceeds to S36. In this manner, when only the route is changed while the destination is maintained, the continuation of the autonomous driving of Level 3 after the route is changed is permitted in S36, and the current continuation determination process is ended.

On the other hand, when it is determined in S34 that the destination is changed, the changed destination and the route to the destination are grasped, and the process proceeds to S37. In this manner, when the route is changed with the change of the destination, the continuation of the autonomous driving of Level 3 after the route is changed is restricted in S37. Specifically, the process proceeds to S37, the temporary interruption or cancellation of the autonomous driving of Level 3 and the shift to the driving support control of the hands-on autonomous driving of Level 2 are determined, and the current continuation determination process is ended.

In the third embodiment described above, the same effects as those of the first embodiment can also be achieved, and the convenience of the autonomous driving related to the route setting can be ensured. Specifically, in the third embodiment, when the route is changed by a change of the destination in a state where the subject vehicle Am travels under the autonomous travel control, the continuation of the autonomous travel control after the route is changed is restricted. On the other hand, when the route is changed while the destination is maintained, the continuation of the autonomous travel control is permitted even after the route is changed. As described above, it is possible to use the autonomous driving with no periphery monitoring obligation for a long time, and thus the convenience of the autonomous driving related to the route setting can be ensured.

Fourth Embodiment

A fourth embodiment of the present disclosure is another modification of the first embodiment. The autonomous driving ECU 50*b* according to the fourth embodiment determines whether the three-dimensional map data used for the autonomous travel control is the latest information. The autonomous driving ECU 50*b* determines that the three-dimensional map data is not the latest information with respect to the three-dimensional map data in which update data is present in a distribution server of the map data provided on the network, or the three-dimensional map data which is not updated over a preset period. The autonomous driving ECU 50*b* avoids traveling under the autonomous travel control in an area in which the three-dimensional map data stored in the map DB 36 is not the latest information (hereinafter, referred to as an unupdated area).

When the navigation ECU 38 searches for a new route during the implementation of the autonomous travel control, the autonomous driving ECU 50*b* checks whether all the three-dimensional map data related to the searched route are the latest information. The autonomous driving ECU 50*b* checks an update state of the three-dimensional map data regardless of the new route setting or the reroute. The autonomous driving ECU 50*b* restricts the continuation of the automated driving control when at least a part of the searched routes passes through the unupdated area. Hereinafter, details of the continuation determination process implemented by the autonomous driving ECU 50*b* of the fourth embodiment and the notification control process and the interruption notice process implemented by the HCU 100 will be described with reference to FIGS. 1 to 3 and 5 based on FIGS. 9 to 11.

Figure 9:
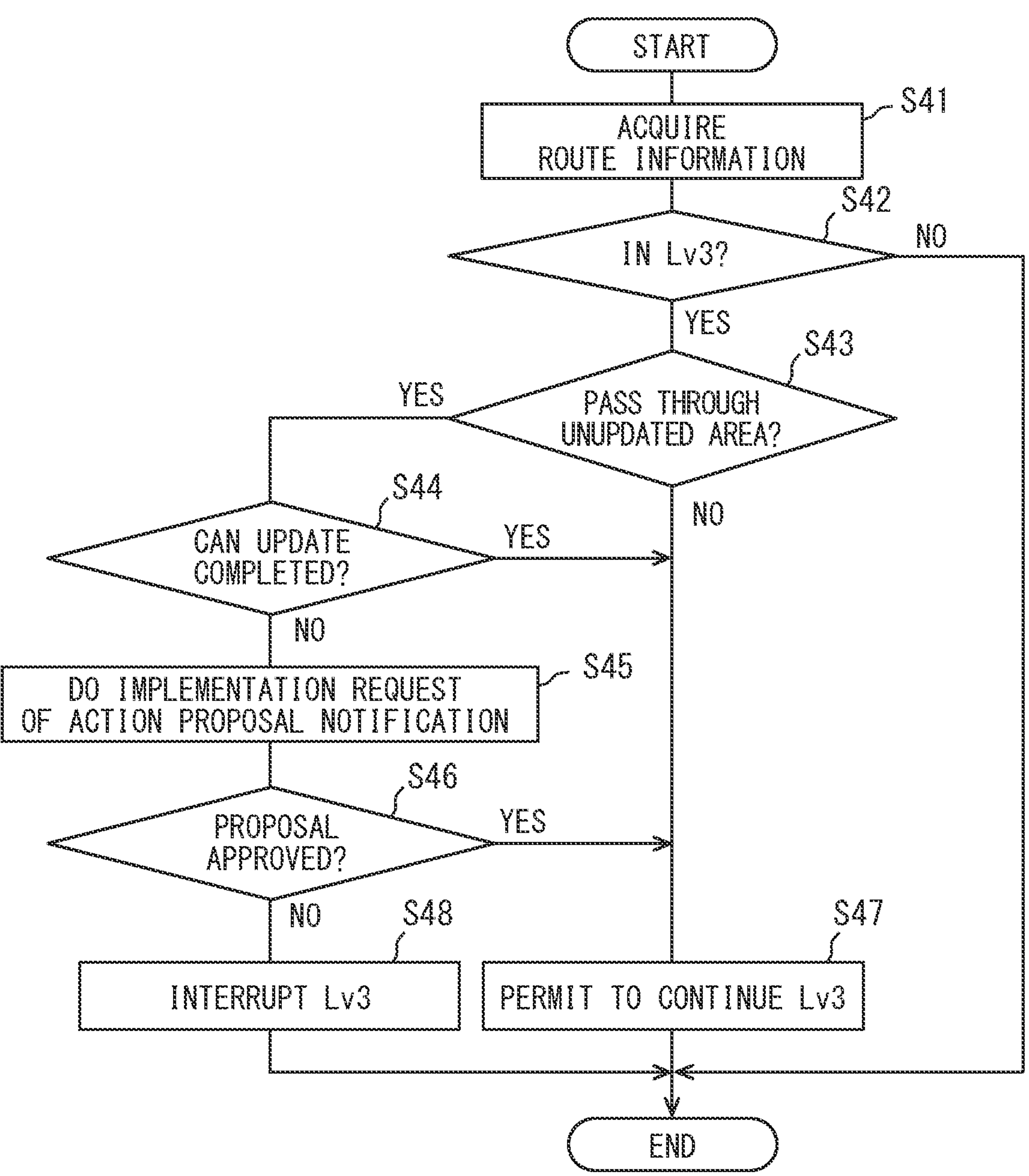
FIG. 9 is a flowchart showing details of a continuation determination process according to a fourth embodiment.

The continuation determination process shown in FIG. 9 is started by the autonomous driving ECU 50*b* that grasps the implementation of the route search when the navigation ECU 38 searches for a route to the destination in the state where the subject vehicle Am travels under the autonomous travel control or the driving support control. The newly searched route to the destination may be immediately set in the navigation ECU 38, or the setting may be suspended until the continuation determination process ends.

In S41 of the continuation determination process, the route information grasping unit 74 acquires the route information indicating the latest route searched by the navigation ECU 38. In S42, the control switching unit 77 determines whether there is a periphery monitoring obligation in the traveling control being implemented. When it is determined in S42 that the driving support control with the periphery monitoring obligation is being implemented, the continuation determination process is ended. On the other hand, when it is determined in S42 that the autonomous travel control (autonomous driving of Level 3) with the periphery monitoring obligation is being implemented, the process proceeds to S43.

In S43, the route information grasping unit 74 acquires the three-dimensional map data related to the newly searched route from the map DB 36 based on the route information acquired in S41. The route information grasping unit 74 verifies whether the acquired three-dimensional map data includes three-dimensional map data that needs to be updated to the latest information. When it is determined in S43 that there is no three-dimensional map data requiring update and the searched route is not a route passing through the unupdated area, the action determination unit 63 permits continuation of the autonomous driving of Level 3 in S47. As described above, the autonomous travel control according to the new route information is started. On the other hand, when it is determined in S43 that there is three-dimensional map data that needs to be updated and the searched route is the route passing through the unupdated area, the process proceeds to S44.

In S44, the route information grasping unit 74 coordinates the locator 35 and determines whether the update of the three-dimensional map data of the unupdated area can be completed before the subject vehicle Am reaches the unupdated area grasped in S43. As an example, the locator 35 calculates time (hereinafter referred to as a reception time) necessary for downloading the three-dimensional map data based on a communication speed of the in-vehicle communication device 39, and creates a download schedule of the three-dimensional map data of the unupdated area. Further, the locator 35 estimates a moving distance of the subject vehicle Am until the reception is completed based on the reception time and the vehicle speed information of the subject vehicle Am. When the moving distance until the completion of reception is shorter than a distance from the current position to the unupdated area, the route information grasping unit 74 determines that the update of the three-dimensional map data can be completed.

When it is determined in S44 that the update of the three-dimensional map data can be completed before the subject vehicle Am reaches the unupdated area, the continuation of the autonomous driving of Level 3 is permitted in S47. When there are multiple unupdated areas on the route, if data reception can be completed before reaching all the unupdated areas, the continuation of autonomous driving of Level 3 is permitted.

On the other hand, when it is determined in S44 that the update of the three-dimensional map data cannot be completed before the subject vehicle Am reaches the unupdated area, in S45, the information coordination unit 61 outputs an implementation request of an action proposal notification (FIG. 10, S150) to the HCU 100. The action proposal notification is a notification for proposing, to the driver, an action for allowing the download of the three-dimensional map data of the unupdated area to be performed in time, in other words, an action for delaying the arrival at the unupdated area. For example, an action of slowing down a set vehicle speed of the subject vehicle Am under the autonomous travel control or stopping the subject vehicle Am for a predetermined time in a service area or the like in front of the unupdated area is proposed to the driver by the action proposal notification.

In S46, the information coordination unit 61 determines whether the implementation of the action proposed in S45 is approved by the driver. When it is determined in S46 that the proposal is approved, it is considered that the update of the three-dimensional map data can be completed before the vehicle arrives at the unupdated area, and the continuation of the autonomous driving of Level 3 is permitted in S47. On the other hand, when it is determined in S46 that the proposal is approved, the temporary interruption or cancellation of the autonomous driving of Level 3 is determined in S48. In this case, after the subject vehicle Am starts traveling along the new route, the traveling control state of the subject vehicle Am is shifted from the autonomous travel control to the driving support control.

Figure 10:
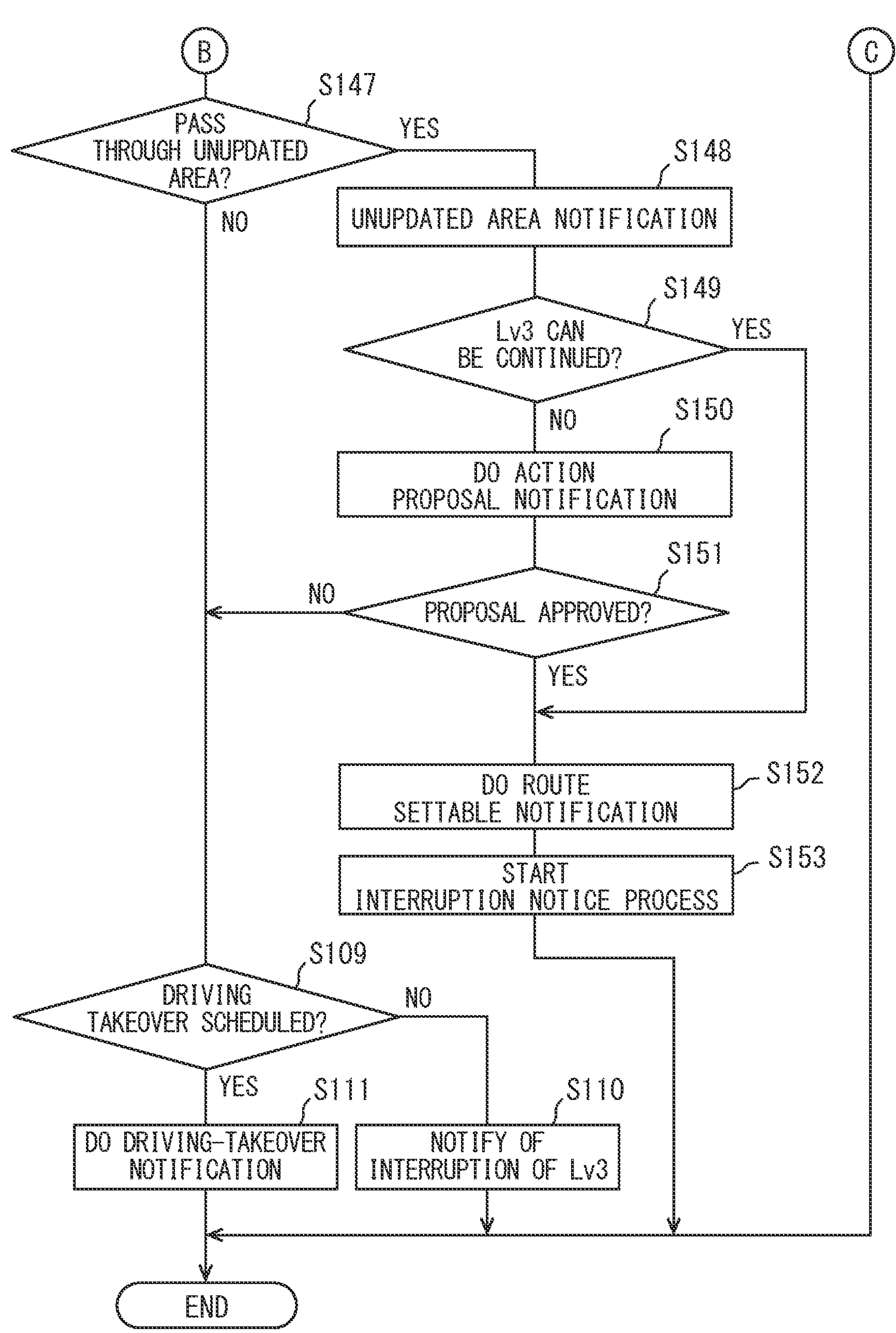
FIG. 10 is a flowchart showing details of the notification control process together with FIG. 5.

The notification control process shown in FIG. 10 is started by the HCU 100 that grasps the implementation of the route search when the navigation ECU 38 searches for a route to the destination in the state where the subject vehicle Am travels under the autonomous travel control or the driving support control. Also in the fourth embodiment, the processing contents of S101 to S106 (see FIG. 5) are substantially the same as those in the first embodiment.

In S147 of the notification control process, the information coordination unit 82 refers to the travel plan of the autonomous travel control grasped in S106 or S107 (see FIG. 5), and determines whether the newly searched route is a route passing through the unupdated area. When it is determined in S147 that the newly searched route is not the route passing through the unupdated area, the presentation control unit 88 implements the Level-3-interruption notification or the driving-takeover notification based on S109 to S111.

On the other hand, when it is determined in S147 that the route passes through the unupdated area, the presentation control unit 88 implements an unupdated area notification in S148. The unupdated area notification is a notification notified to the driver that there is an unupdated area on the route of the subject vehicle Am. In the unupdated area notification, a message such as "map data needs to be updated" is displayed on the meter display 21, the HUD 23, and the like. In the unupdated area notification, in the map image displayed in the CID 22, a display color of a route section corresponding to the unupdated area may be highlighted in a display color different from that of the route section which is not the unupdated area. Further, in the unupdated area notification, an inquiry such as "Do you want to update the map data?" may be implemented.

In S149, it is determined whether the autonomous travel control is continued. In the continuation determination process, when the update of the three-dimensional map data can be completed before reaching the unupdated area and the continuation of the autonomous travel control is permitted (see S44 and S47 in FIG. 9), it is determined that the autonomous travel control is continued in S149. In S152, the presentation control unit 88 implements a route settable notification using the meter display 21 or the HUD 23. The route settable notification may be a notification that also serves as the Level-3-continuation notification (see S108 in FIG. 6). In the route settable notification, the driver is notified that the route passing through the unupdated area can be set as a new route without interrupting the autonomous travel control. On the other hand, when it is determined in S149 that the autonomous travel control is not continued, the process proceeds to S150.

In S150, the presentation control unit 88 implements the action proposal notification based on the implementation request (see S45 in FIG. 9) acquired from the autonomous driving ECU 50*b*. In the action proposal notification, the action for delaying reaching the unupdated area is presented to, for example, the meter display 21 or the CID 22. One or multiple actions may be presented. The driver can cause the autonomous driving ECU 50*b* to implement the action for delaying arrival by a user operation of selecting the presented action.

In S151, the information coordination unit 82 determines whether the proposal is approved based on the presence or absence of the user operation for selecting the action. In S151, when the information control unit 81 grasps the implementation of the user operation for selecting the action, the information coordination unit 82 determines that the action is approved, and notifies the autonomous driving ECU 50*b* of the approval of the proposal. Thus, the autonomous travel control can be continued. As a result, in S152, the presentation control unit 88 implements the route settable notification. Further, in S153, the interruption notice process (see FIG. 11) is started.

Figure 11:
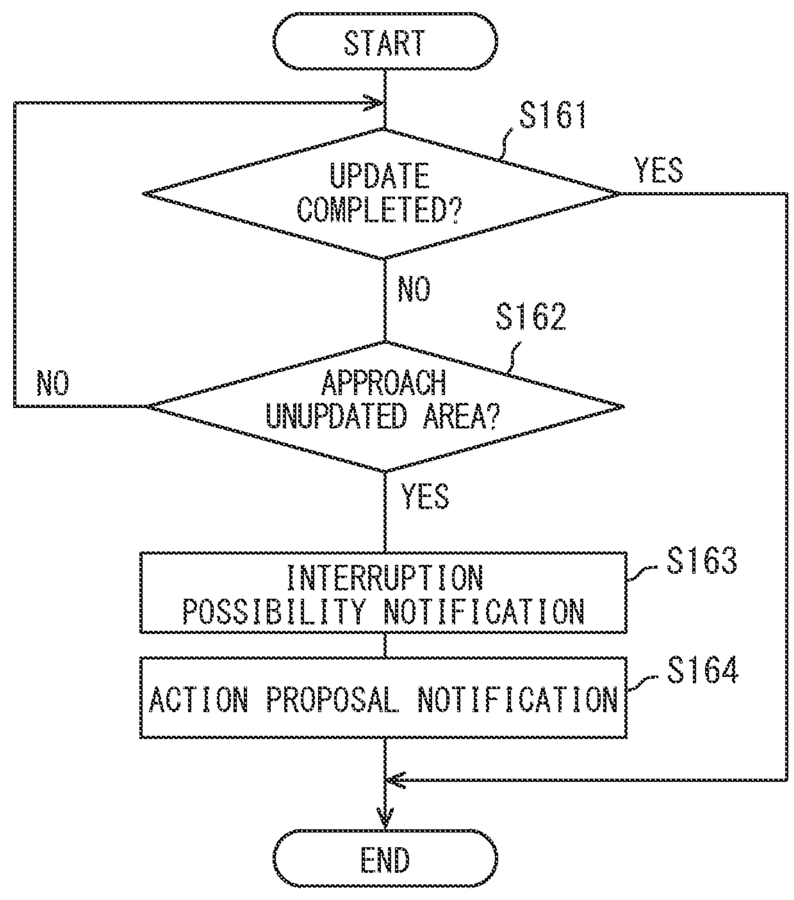
FIG. 11 is a flowchart showing details of an interruption notice process.

The interruption notice process shown in FIG. 11 is processing of notifying of a possibility of interruption of the autonomous travel control when the download of the three-dimensional map data is not completed although the distance to the unupdated area is within the predetermined distance. In S161 of the interruption notice process, the information control unit 81 or the information coordination unit 82 grasps the update state of the three-dimensional map data in the map DB 36 and grasps whether the download and update process is completed. When it is determined in S161 that the update of the three-dimensional map data is completed, the interruption notice process is ended. On the other hand, when it is determined in S161 that the update of the three-dimensional map data is not completed, the process proceeds to S162.

In S162, the information control unit 81 determines whether the subject vehicle Am approaches the unupdated area. As an example, the information control unit 81 acquires the position information of the subject vehicle Am from the locator 35, and determines that the subject vehicle Am approaches the unupdated area when the distance from the subject vehicle Am to the unupdated area is less than a predetermined distance (for example, several kilometers). The information control unit 81 may determine that the subject vehicle Am approaches the unupdated area at a timing at which an expected time point of arrival at the unupdated area becomes remaining several minutes. When it is determined in S162 that the subject vehicle Am does not approach the unupdated area, the process returns to S161. On the other hand, when it is determined in S162 that the subject vehicle Am approaches the unupdated area, the process proceeds to S163.

In S163, the presentation control unit 88 implements an interruption possibility notification. The interruption possibility notification is a notification notified to the driver that the autonomous travel control is scheduled to be interrupted and the autonomous travel control with no periphery monitoring obligation is generated. In the interruption possibility notification, for example, a message such as "autonomous driving is scheduled to end" is displayed on the meter display 21, the CID 22, or the like. In the interruption possibility notification, an alert may be implemented by voice.

In S164, the presentation control unit 88 implements the action proposal notification. The action proposal notification may be started after the interruption possibility notification ends, or may be implemented together with the interruption possibility notification. Also in the action proposal notification implemented after the vehicle approaches the unupdated area, similarly to the action proposal notification implemented before the vehicle approaches the unupdated area (see S150 in FIG. 10), an action such as a setting change to slow down the set vehicle speed or a stop to the service area is proposed to the driver.

In the fourth embodiment described above, when a route passing through an unupdated area requiring update of the three-dimensional map data is searched for, the presence of the unupdated area is notified. Therefore, the driver can recognize that the information necessary to continue the autonomous travel control is insufficient and there is a risk to interrupt the autonomous travel control. As described above, since the possibility of the state change of the autonomous driving is indicated in advance, the convenience of the autonomous driving related to the route setting is easily secured.

In addition, in the fourth embodiment, when the update of the three-dimensional map data of the unupdated area can be completed before the subject vehicle Am reaches the unupdated area, the presentation control unit 88 notifies the autonomous driving ECU 50*b* that the searched route can be set. According to the route settable notification, the driver can grasp that the autonomous travel control can be continuously used while recognizing the risk of interrupting the autonomous travel control. Accordingly, it is possible to improve the convenience of the autonomous driving related to the route setting.

In the fourth embodiment, when the subject vehicle Am approaches the unupdated area without completing the update of the three-dimensional map data of the unupdated area, the possibility of interrupting the autonomous travel control is notified. Therefore, for example, even if the driver implements a second task before the interruption of the autonomous travel control, the driver can smoothly restart the periphery monitoring and the driving operation.

Further, in the fourth embodiment, when the update of the three-dimensional map data of the unupdated area cannot be completed before the subject vehicle Am reaches the unupdated area, the action for delaying reaching the unupdated area is proposed. According to such a proposal, the driver can easily continuously use the autonomous travel control. In the fourth embodiment, the three-dimensional map data corresponds to the "map data".

Fifth Embodiment

A fifth embodiment of the present disclosure is another modification of the first embodiment. In the fifth embodiment, the implementation of the continuation determination process (see FIG. 4 and the like) by the autonomous driving ECU 50*b* is omitted. When the route setting is performed during the traveling under the autonomous travel control, the autonomous driving ECU 50*b* permits the continuation of the autonomous travel control in principle regardless of whether the route setting is the new route setting and the control mode is being implemented. In addition, the autonomous driving ECU 50*b* can implement an autonomous lane change (hereinafter, referred to as an autonomous LC) while continuing the autonomous travel control with no periphery monitoring obligation.

When the driver performs a series of user operations (hereinafter referred to as setting operations) for setting a destination in the navigation ECU 38, the HCU 100 grasps contents of the series of setting operations by the information control unit 81. When a setting operation for performing a new route setting or a reroute as the route setting is started, the HCU 100 implements, before the route setting is completed, a notification (hereinafter, referred to as a pre-determination notification, see FIG. 12) for alerting the vehicle control scheduled to be started after the route setting is completed. In addition, after the setting operation is completed, the HCU 100 implements a notification (hereinafter, post-determination notification, see FIG. 12) for alerting the vehicle control scheduled to be implemented. Hereinafter, details of each notification control process for implementing the pre-determination notification and the post-determination notification will be further described with reference to FIGS. 12 and 1 to 3 based on FIGS. 13 and 14.

Figure 12:
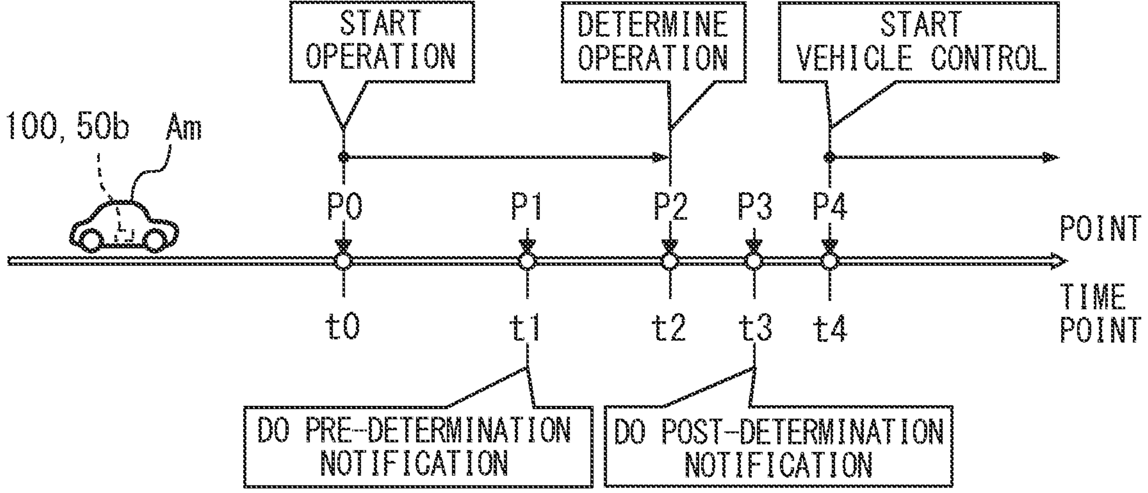
FIG. 12 is a timing chart showing details of notifications and control in a scene in which a route setting according to a fifth embodiment is performed.
Figure 13:
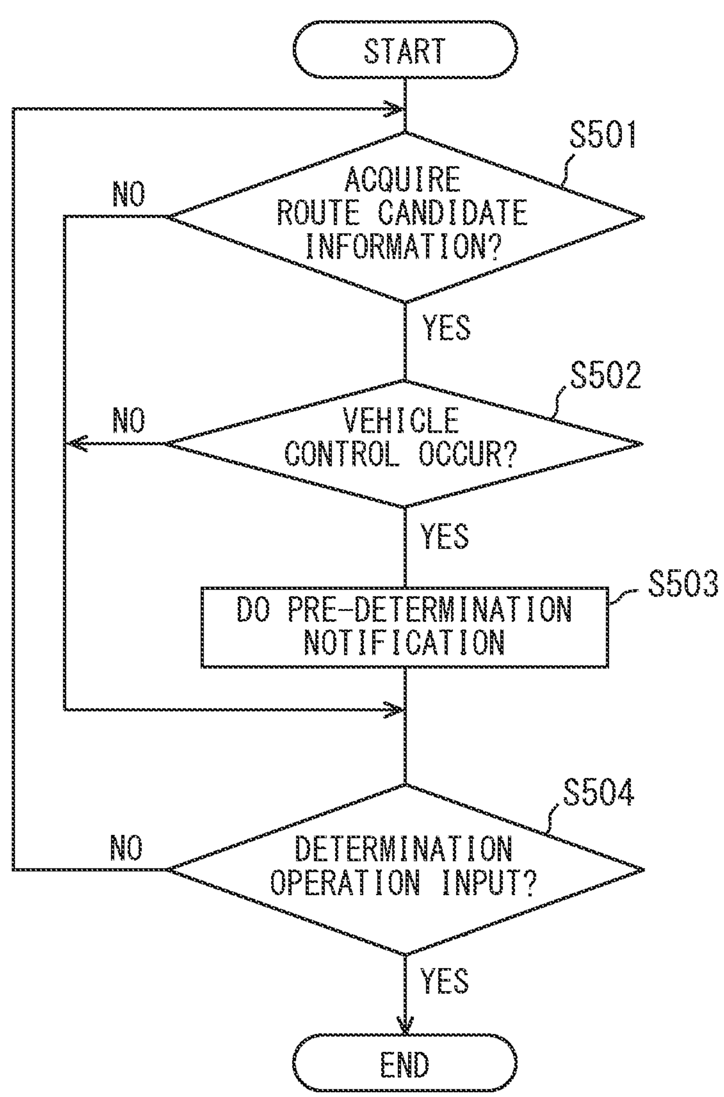
FIG. 13 is a flowchart showing details of a notification control process for implementing a pre-determination notification.

The notification control process for implementing the pre-determination notification shown in FIG. 13 is started by the HCU 100 based on a fact that the start of the setting operation is grasped by the information control unit 81 (see point P0 or time point t0 in FIG. 12).

In S501, the information control unit 81 acquires route candidate information indicating a route before a determination from the navigation ECU 38. The navigation ECU 38 estimates a rough direction (direction) of a destination in a period in which a candidate of the destination or a candidate of a route is presented as choices, and generates the route candidate information to be provided to the information control unit 81. The information control unit 81 may acquire one or multiple pieces of route candidate information from the navigation ECU 38. In addition, the information control unit 81 may be able to acquire, from the navigation ECU 38, the route candidate information obtained by cutting out only a route of a nearby section in which the vehicle travels.

When the route candidate information is acquired (S501: YES), the information control unit 81 estimates whether the vehicle control by the autonomous driving ECU 50*b* occurs after the destination is determined in S502 based on the acquired route candidate information. The vehicle control is, for example, the autonomous LC and a setting change of a target cruising speed.

When the occurrence of the vehicle control is estimated by the information control unit 81 (S502: YES), the presentation control unit 88 implements the pre-determination notification in S503 (see point P1 or time point t1 in FIG. 12). The pre-determination notification is implemented before a determination operation for determining a destination (see point P2 or time point t2 in FIG. 12) is implemented. The presentation control unit 88 grasps a content of the vehicle control estimated by the information control unit 81, and indicates the content of the vehicle control scheduled to be implemented to the driver in the pre-determination notification.

After the pre-determination notification is implemented by the presentation control unit 88, the information control unit 81 determines whether the determination operation is input. When there is no input of the determination operation (S504: NO), the information control unit 81 continues to acquire the route candidate information. As a result, when the driver changes the destination as a candidate, the pre-determination notification assuming the route candidate to the destination candidate after the change may be implemented. On the other hand, when the determination operation is input, the current notification control process is ended.

The determination of whether the vehicle control based on the route candidate information occurs may be implemented by the action determination unit 63 of the autonomous driving ECU 50*b*. In this embodiment, the action determination unit 63 generates a temporary travel plan based on the route candidate information. The temporary travel plan is provided to the HCU 100 through the information coordination unit 61. As a result, in the notification control process, as processes corresponding to S501 and S502, the information coordination unit 82 implements a process of determining whether the vehicle control occurs after the destination is determined based on the temporary travel plan.

Figure 14:
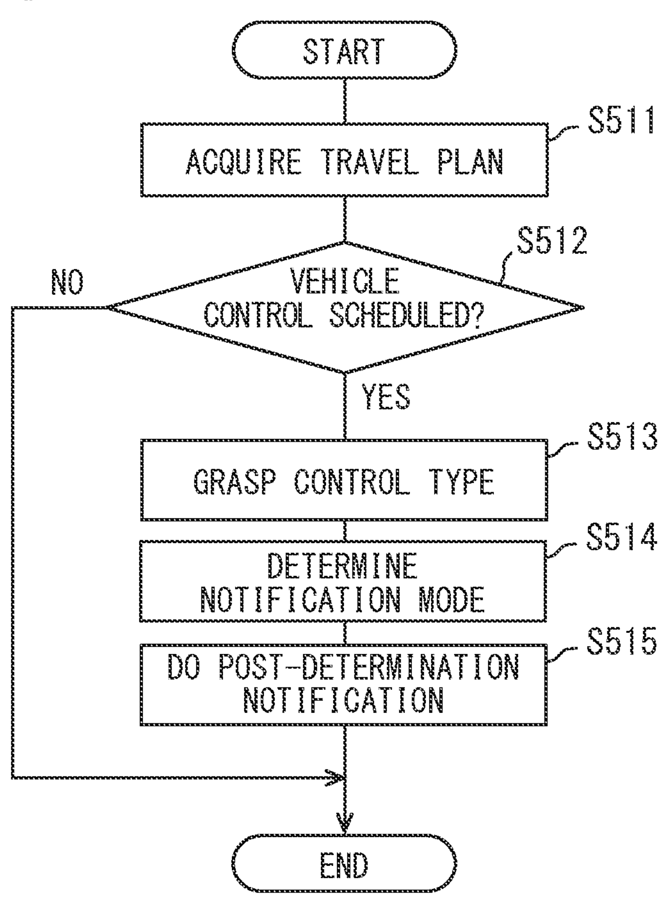
FIG. 14 is a flowchart showing details of a notification control process for implementing a post-determination notification.

The notification control process for implementing the post-determination notification shown in FIG. 14 is started by the HCU 100 based on a fact that the input of the determination operation for determining the destination is grasped by the information control unit 81 (see point P2 or time point t2 in FIG. 12). That is, the notification control process for implementing the post-determination notification is started at the end of the notification control process for implementing the pre-determination notification.

In S511, the information coordination unit 82 acquires the travel plan of the subject vehicle Am generated by the action determination unit 63 after the route is set. In S512, the information coordination unit 82 refers to the acquired travel plan and determines whether the implementation of the vehicle control while continuing the autonomous travel control is scheduled within a predetermined time (about 30 seconds) or a predetermined distance (about 1 km) after the route is set. When immediate vehicle control is not scheduled (S512: NO), the current notification control process ends.

On the other hand, when immediate vehicle control is scheduled (S512: YES), the information control unit 81 grasps a type of the vehicle control scheduled to be implemented such as the autonomous LC and the change of the cruising speed in S513. In addition, when the implementation of the autonomous LC is scheduled, the information control unit 81 further grasps a type of the autonomous LC. Specifically, the information control unit 81 grasps whether the lane change is a movement to a branched lane or a movement to an adjacent lane for preparation for the movement to the branched lane. In other words, the information control unit 81 determines whether multiple autonomous LCs are scheduled.

In S514, the presentation control unit 88 determines a mode of the post-determination notification in accordance with the type of the vehicle control grasped in S513. In addition, when the implementation of the autonomous LC is scheduled, the presentation control unit 88 changes strength of the post-determination notification according to the type of the autonomous LC. The presentation control unit 88 implements the post-determination notification in S515 based on the determined notification mode (see point P3 or time point t3 in FIG. 12). The post-determination notification is implemented before a timing at which the vehicle control is started (see point P4 or time point t4 in FIG. 12).

Similarly to the pre-determination notification, the presentation control unit 88 indicates contents of the vehicle control scheduled to be implemented to the driver in the post-determination notification. In addition, the presentation control unit 88 changes the strength of the post-determination notification according to the type of the autonomous LC, and the strength of the post-determination notification in the case of the movement to the branched lane is stronger than that in the case of the movement to the adjacent lane. As described above, when the autonomous LC of moving to the branch lane, that is, the only or last autonomous LC is scheduled to be implemented, the post-determination notification of the emphasized mode is implemented. On the other hand, when the autonomous LC of moving to the adjacent lane for the branch preparation, that is, the autonomous LC that is not the last one of multiple times of the autonomous LC is scheduled to be implemented, the post-determination notification in a normal or weakened mode is implemented. When the autonomous LC of moving to the adjacent lane is scheduled to be implemented, the post-determination notification may be omitted.

In the fifth embodiment described above, the same effects as those of the first embodiment can also be achieved, and the convenience of the autonomous driving related to the route setting can be ensured. Specifically, in the fifth embodiment, when the autonomous LC under the autonomous travel control is scheduled within a predetermined time or a predetermined distance after the route is set, the information coordination unit 82 grasps the type of the autonomous LC. Then, the presentation control unit 88 changes the strength of the post-determination notification indicating the implementation of the autonomous LC according to the type of the autonomous LC. Therefore, the driver can grasp the type of the autonomous LC based on the strength of the post-determination notification. As a result, even in the system in which the implementation of the autonomous LC is permitted, the convenience of the autonomous driving related to the route setting can be ensured.

In addition, in the fifth embodiment, whether the lane change is the movement to a branched lane or the movement to an adjacent lane for preparation for the movement to the branched lane is grasped. The post-determination notification in the case of the movement to the branched lane is stronger than that in the case of the movement to the adjacent lane. Therefore, the driver can grasp whether the vehicle moves to the branched lane from the strength of the post-determination notification.

In the fifth embodiment, when the driver performs a series of setting operations for setting the destination, the pre-determination notification is implemented before the determination operation for determining the destination is performed. In the pre-determination notification, the vehicle control scheduled to be implemented is notified after the destination is determined. Therefore, even in a scene in which a behavior change of the subject vehicle Am immediately occurs after the input of the determination operation, the occupant such as the driver can be alerted of the occurrence of the behavior change in advance. As a result, since uneasiness of the occupant due to the behavior change can be reduced, the convenience of the autonomous driving can be more easily secured.

Sixth Embodiment

Figure 15:
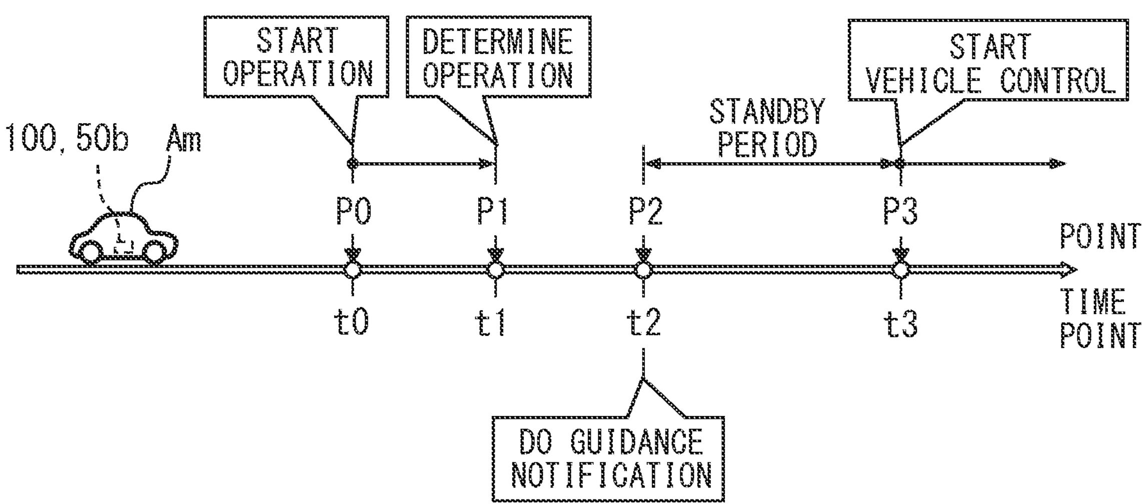
FIG. 15 is a timing chart showing details of notifications and control in a scene in which a route setting according to a sixth embodiment is performed.

A sixth embodiment according to the present disclosure is a modification of the fifth embodiment. In the sixth embodiment, similarly to the fifth embodiment, the implementation of the autonomous LC by the autonomous driving ECU **50*b* is permitted. Hereinafter, details of control implemented by the autonomous driving ECU 50*b* according to the sixth embodiment will be described based on FIGS. 15 and 16 with reference to FIGS. 1 to 3**.

Figure 16:
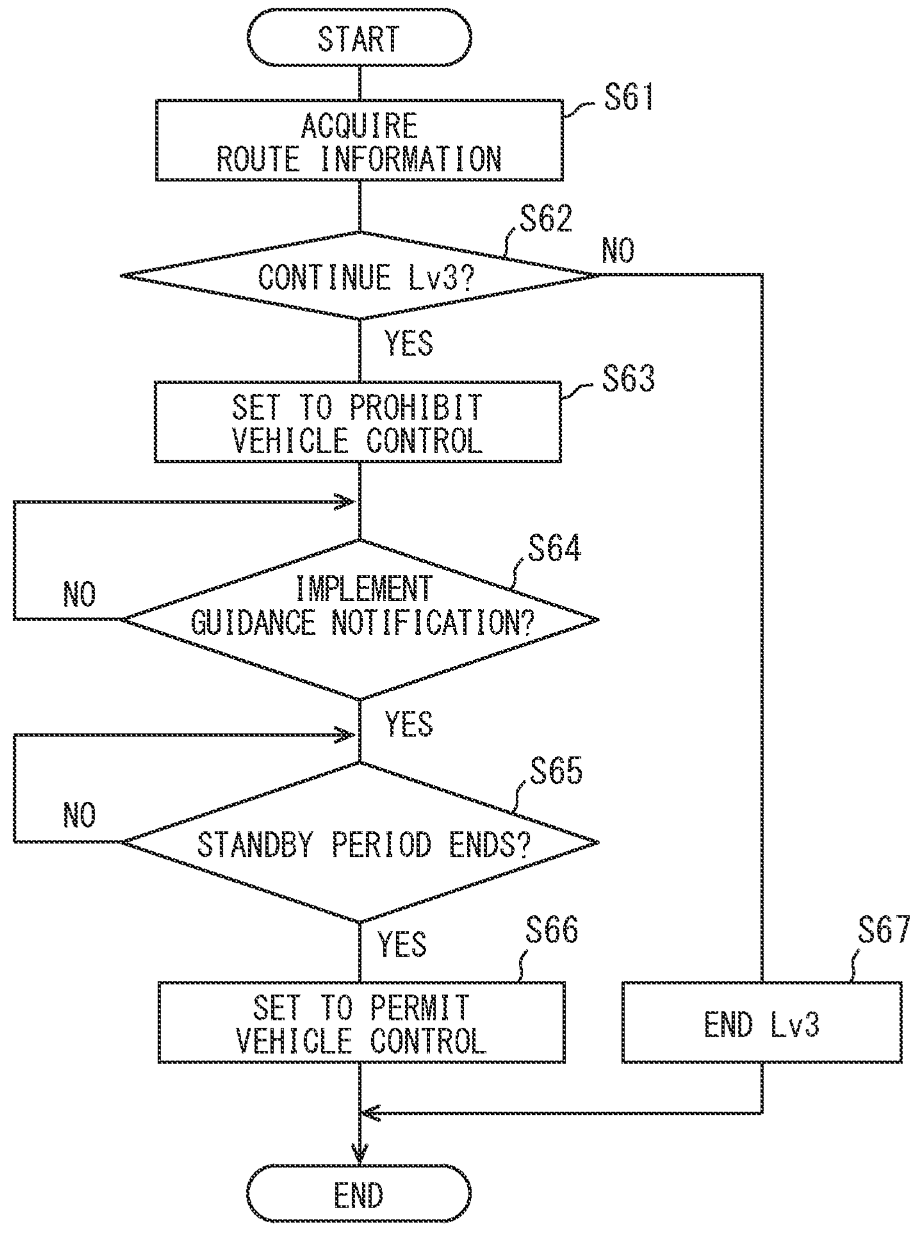
FIG. 16 is a flowchart showing details of a control standby process for providing a standby period of vehicle control after setting a route.

When the autonomous travel control with no periphery monitoring obligation is continued after the route is set by the implementation of a control standby process, the autonomous driving ECU **50*b* stops the start of the vehicle control based on the new set route for a certain period of time (see FIG. 16). The control standby process is started based on the implementation of a series of setting operations (refer to points P0 to P1 or time points t0 to t1 in FIG. 15**) by the driver.

In S61 of the control standby process, the route information grasping unit 74 acquires the newly set route information and grasps contents of the changed route set in the navigation ECU 38. In S62, the control switching unit 77 determines whether to continue the autonomous travel control of Level 3 based on the route grasped in S61. When it is determined that the autonomous travel control cannot be continued (S62: NO), the control switching unit 77 ends the autonomous travel control of Level 3 in S67. On the other hand, when the autonomous travel control is to be continued (S62: YES), the action determination unit 63 changes the setting to prohibit the start of the vehicle control in S63. As described above, when the change of the route is grasped by the route information grasping unit 74 and the continuation of the autonomous travel control is permitted by the control switching unit 77, the start of the vehicle control based on the changed route is temporarily in a standby state. The vehicle control such as the autonomous LC, the change of the cruising speed, overtaking control, and passing control temporarily enters the standby state.

In S64, the action determination unit 63 determines whether a guidance notification for guiding the driver to the newly set route is implemented. For example, the HCU 100 implements a route display by the CID 22 as a guidance notification. The action determination unit 63 may grasp whether to implement the guidance notification based on notification implementation information provided from the HCU 100 to the information coordination unit 61, or may consider that the guidance notification is implemented when a predetermined time elapses from the end of the determination operation.

When it is determined that the guidance notification is implemented (S64: YES), the action determination unit 63 is on standby for the end of a standby period (refer to points P2 to P3 or time points t2 to t3 in FIG. 15) in S65. The action determination unit 63 determines that the standby period is ended when the subject vehicle Am travels for a predetermined time (about 30 seconds) or a predetermined distance (about 1 km) after the guidance notification is implemented. The action determination unit 63 changes the setting to permit the start of the vehicle control based on an end determination of the standby period (S65: YES). Accordingly, the vehicle control based on the changed route is started (see point P3 or time point t3 in FIG. 15).

In the sixth embodiment described above, the same effects as those of the fifth embodiment can also be achieved, and even when the autonomous travel control is continued after the route is set, the convenience of the autonomous driving related to the route setting can be ensured. Specifically, in the sixth embodiment, when the new route setting or the reroute is performed, the start of the vehicle control is on standby until the subject vehicle Am travels for a predetermined time or a predetermined distance after the guidance notification. By setting the standby period in this manner, it is possible to provide a time margin from the guidance notification to the start of the vehicle control. As a result, the driver is less likely to feel uneasy in the vehicle control implemented based on the set route, and thus the convenience of the autonomous driving can be ensured. In the sixth embodiment, the action determination unit 63 corresponds to a "travel control unit".

Seventh Embodiment

Figure 17:
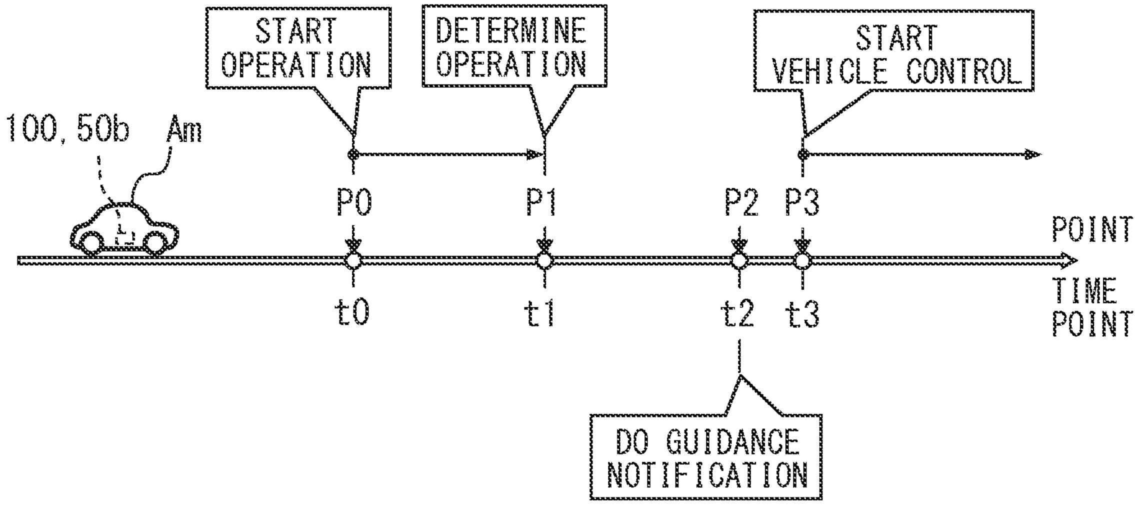
FIG. 17 is a timing chart showing details of notifications and control in a scene in which a route setting is performed on a road having no travel history according to a seventh embodiment.
Figure 18:
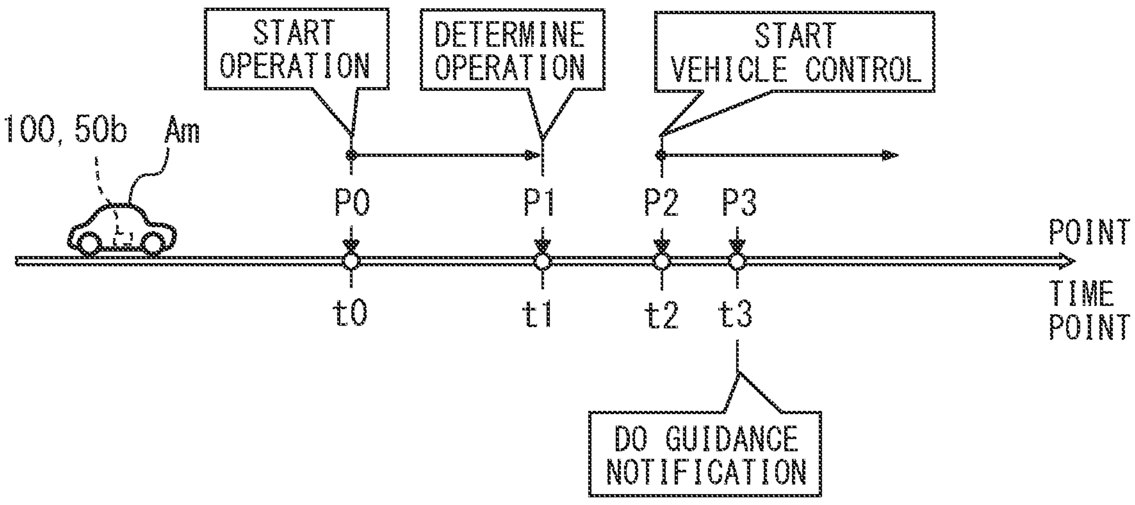
FIG. 18 is a timing chart showing details of notifications and control in a scene in which a route setting is performed on a road having a travel history.

A seventh embodiment according to the present disclosure is another modification of the fifth embodiment. Similarly to the sixth embodiment, the autonomous driving ECU 50*b* according to the seventh embodiment also starts the control standby process (see FIG. 19) based on the implementation of the series of setting operations (see points P0 to P1 or time points t0 to t1 in FIGS. 17 and 18) by the driver. When the autonomous travel control with no periphery monitoring obligation is continued after the route is set by the implementation of a control standby process, the autonomous driving ECU 50*b* changes a start timing of the vehicle control based on the new set route for a certain period of time. Hereinafter, details of control implemented by the autonomous driving ECU 50*b* according to the seventh embodiment will be described based on FIGS. 17 to 19 with reference to FIGS. 1 to 3.

Figure 19:
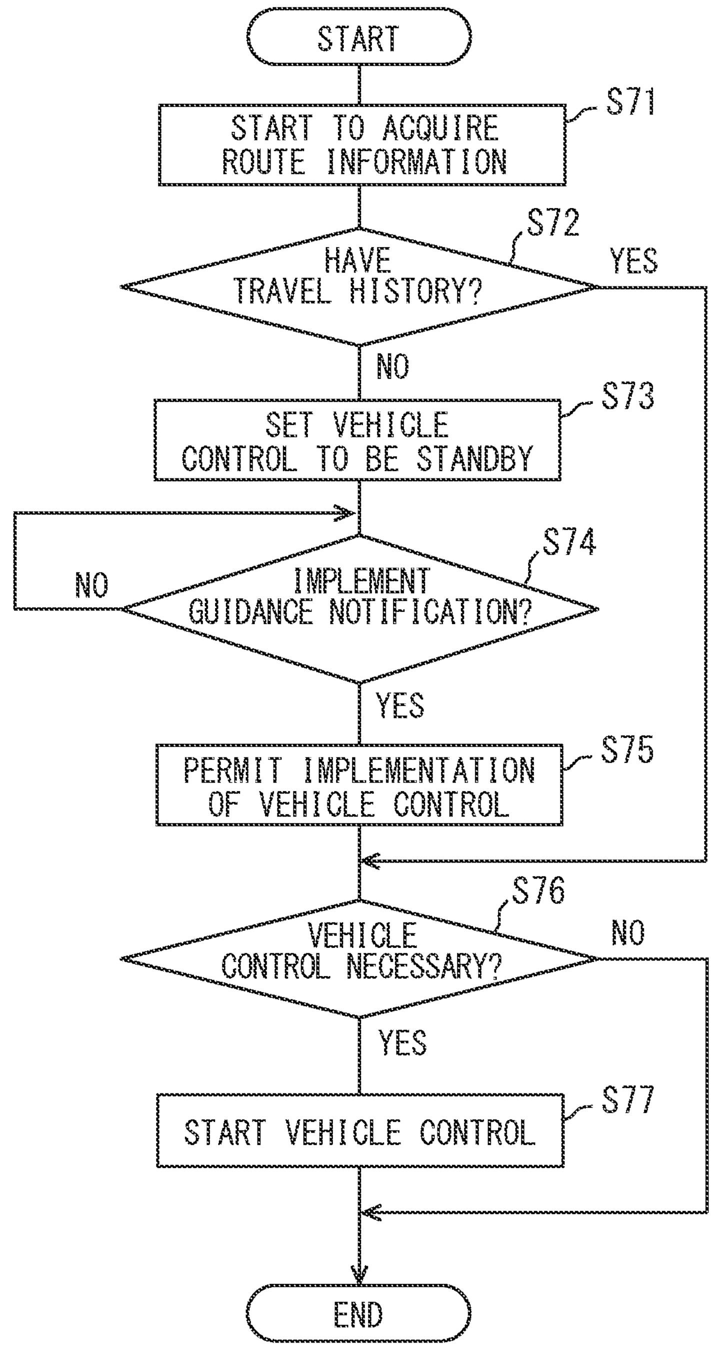
FIG. 19 is a flowchart showing details of a standby control process for changing a start timing of vehicle control according to presence or absence of the travel history.

In S71 of the control standby process shown in FIG. 19, the route information grasping unit 74 starts acquiring newly set route information. In S72, it is determined whether there is a history of past traveling on a road on which the subject vehicle Am is currently traveling. The action determination unit 63 determines whether the road is a road on which the vehicle has traveled based on history information provided from the navigation ECU 38.

When the subject vehicle Am travels on a road having a history of traveling in the past (S72: YES), the processes of S73 to S75 are skipped. On the other hand, when the subject vehicle Am travels on a road having no history of traveling in the past (S72: NO), the action determination unit 63 changes the setting to prohibit the start of the vehicle control in S73. Further, in S74, the action determination unit 63 determines whether a guidance notification for guiding the driver to the new route is implemented by the HCU 100. When it is determined that the guidance notification is implemented (S74: YES), the action determination unit 63 changes the setting to permit the start of the vehicle control in S75.

In S76, the action determination unit 63 generates a travel plan based on the acquired route information and determines whether it is necessary to implement the vehicle control based on the new set route. When the implementation of the vehicle control is unnecessary (S76: NO), the current control standby process ends. When the autonomous travel control of Level 3 is ended, the current control standby process also ends. On the other hand, when the implementation of the vehicle control is necessary (S76: YES), the action determination unit 63 starts the vehicle control in S77.

According to the above, when the vehicle travels on a road having no travel history, that is, a road that the driver does not know, the start of the vehicle control based on the changed route is on standby until the implementation of the guidance notification is completed by the processes of S73 to S75. As a result, even when the route information is acquired before the guidance notification (see point P2 or time point t2 in FIG. 17) is implemented, the start of the vehicle control is suspended. After the guidance notification is implemented, the vehicle control is started (see point P3 or time point t3 in FIG. 17).

On the other hand, when the vehicle travels on a road having a travel history, that is, a road known by the driver, the processes of S73 to S75 are skipped. Therefore, even before the guidance notification (see point P3 or time point t3 in FIG. 18) is implemented, when the route information is acquired, the vehicle control is started (see point P2 or time point t2 in FIG. 18).

In the seventh embodiment described above, the same effects as those of the fifth and sixth embodiments can also be achieved, and even when the autonomous travel control is continued after the route is set, the convenience of the autonomous driving related to the route setting can be ensured.

More specifically, route calculation performed by the navigation ECU 38 requires time for calculation. In addition, when it is necessary to update the high accuracy map data, it may take time for downloading. Therefore, when the new route setting or the reroute is performed, a predetermined time is inevitably generated from the input of the determination operation by the driver to the implementation of the guidance notification.

Therefore, in the seventh embodiment, when the new route setting or the reroute is performed, the vehicle control is started after the guidance notification for guiding the driver to the newly set route is implemented. Therefore, it is possible to avoid a situation in which a sudden change in behavior occurs before the guidance notification is implemented and in a state in which the driver is not able to grasp the changed route, and the occupant such as the driver becomes uneasy. As described above, the convenience of the autonomous driving is more easily secured.

In addition, in the seventh embodiment, when the subject vehicle Am travels on a road having a history of traveling in the past, the vehicle control is started even before the guidance notification is implemented. Therefore, in a scene in which the vehicle travels on a known road and the occupant hardly feels uneasy, the vehicle control can be started at a timing at which preparation is performed. As described above, if the vehicle control is started quickly, the delay in the start of the control is less likely to lead to an uncomfortable feeling of the driver. As a result, the convenience of the autonomous driving is more easily secured.

In addition, in the seventh embodiment, when the subject vehicle Am travels on a road having no history of traveling in the past, the vehicle control is started after the guidance notification is implemented. Therefore, in a scene in which the vehicle travels on an unknown road and is likely to feel uneasy, control for reducing uneasiness is preferentially implemented. As described above, the convenience of the autonomous driving can be further ensured by separately using the reduction of the uneasiness and a quick control shift. In the seventh embodiment, the environment recognition unit 62 corresponds to a "history determination unit".

Eighth Embodiment

An eighth embodiment of the present disclosure is another modification of the fifth embodiment. In the eighth embodiment, the navigation ECU 38 predicts a destination selected by the driver in a period (refer to points P0 to P3 or time points to to t3 in FIG. 20) in which the driver performs a series of setting operations for setting the destination. The navigation ECU 38 starts calculation of a route to a predicted new destination (hereinafter referred to as a destination candidate) before a determination operation for determining a destination is input. The navigation ECU 38 provides at least a part of the route toward the predicted destination candidate as a temporary route to the autonomous driving ECU 50*b*. The route information indicating the temporary route is substantially the same as the route candidate information of the fifth embodiment, and includes at least information indicating a direction of the subject vehicle Am.

Figure 20:
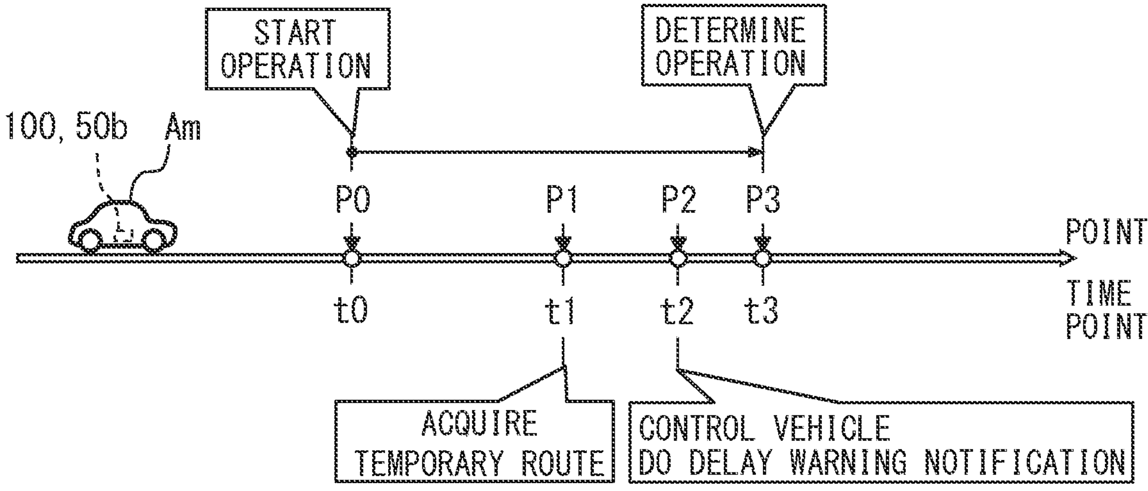
FIG. 20 is a timing chart showing details of notifications and control in a scene in which a route setting according to an eighth embodiment is performed.

The autonomous driving ECU 50*b* starts an advanced control process (see FIG. 21) and the notification control process (see FIG. 22) based on the start of the setting operation by the driver (see point P0 or time point to in FIG. 20). In the advanced control process and the notification control process, the vehicle control and the notification based on the temporary route are implemented.

Figure 21:
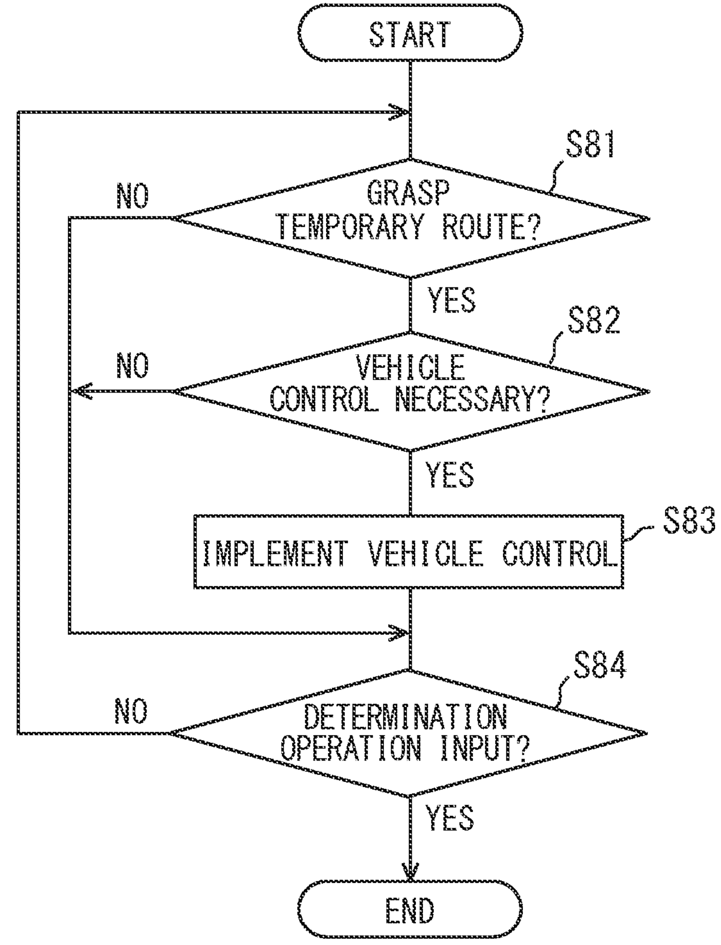
FIG. 21 is a flowchart showing details of a control start process of starting vehicle control before a determination operation.

The advanced control process shown in FIG. 21 enables the start of the vehicle control based on the temporary route before a timing at which a final operation is performed (see point P3 or time point t3 in FIG. 20). Specifically, in S81 of the advanced control process, the route information grasping unit 74 grasps the temporary route based on the route information provided from the navigation ECU 38. When the temporary route can be grasped (S81: YES), the action determination unit 63 determines whether the vehicle control based on the temporary route is necessary in S82.

When it is determined that the vehicle control is necessary (S82: YES), the action determination unit 63 starts the vehicle control according to the temporary route in S83. As an example, when a branch point is present within a predetermined distance (for example, about several kilometers) and a lane change is necessary near the branch point, the action determination unit 63 determines that the autonomous LC as the vehicle control is necessary and causes the autonomous LC to be implemented on a lane suitable for traveling to the destination candidate. On the other hand, when the temporary route cannot be grasped (S81: NO), or when immediate vehicle control is not necessary (S82: NO), the vehicle control is not implemented.

In S84, the information coordination unit 61 grasps whether the determination operation is input by the driver. By repeating S81 to S83 until the input of the determination operation is grasped by the driver, the vehicle control based on the temporary route is implemented in advance with respect to the determination operation. When the input of the determination operation is grasped in S84, the advanced control process is ended.

Figure 22:
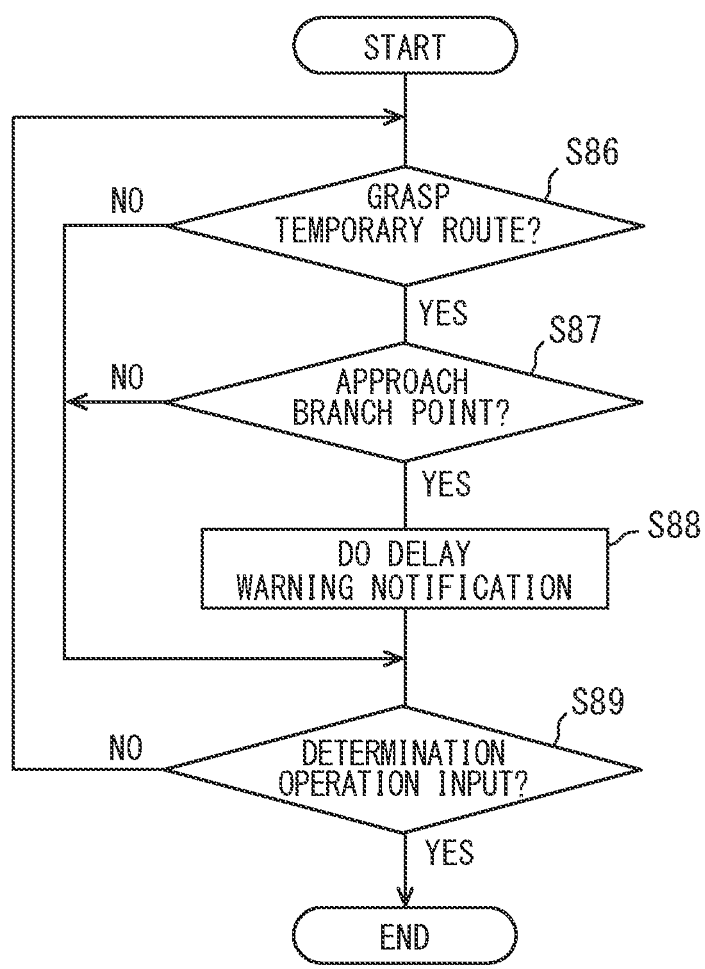
FIG. 22 is a flowchart showing details of the notification control process for implementing a delay warning notification.

The notification control process shown in FIG. 22 enables implementation of a delay warning notification that warns the driver of a possibility of a delay in arrival at the destination before the timing (see point P3 or time point t3 in FIG. 20) at which the final operation is performed. Specifically, even in S86 of the notification control process, the route information grasping unit 74 grasps the temporary route based on the route information provided from the navigation ECU 38. When the temporary route can be grasped (S86: YES), the action determination unit 63 determines in S87 whether the nearest branch point set in the temporary route is approached. When the branch point is present within the predetermined time or the predetermined distance (S87: YES), the information coordination unit 61 implements the delay warning notification using the display device by outputting an implementation request to the HCU 100 in S88. In the delay warning notification, an occupant such as a driver is warned that, when a new destination and a route to the destination are not determined soon, the vehicle passes through the nearest branch point and a significant delay may occur in arrival. On the other hand, when the temporary route cannot be grasped (S86: NO) or when the nearest branch point is not present (S87: NO), the delay warning notification is not implemented.

In S89, the information coordination unit 61 grasps whether the determination operation is input by the driver. By repeating S86 to S88 until the input of the determination operation is grasped by the driver, the delay warning notification based on the temporary route is implemented in advance with respect to the determination operation. When the input of the determination operation is grasped in S89, the notification control process is ended. The notification control process may be implemented by the HCU 100 that acquires the temporary route from the navigation ECU 38.

In the eighth embodiment described above, the same effects as those of the above embodiments can also be achieved, and the convenience of the autonomous driving related to the route setting can be ensured. Specifically, in the eighth embodiment, when the driver performs a series of setting operations for setting the destination, the set destination is predicted before the final operation for determining the destination is performed. At least a part of the route toward the predicted destination is grasped by the route information grasping unit 74 as a temporary route. Therefore, the vehicle control or the notification related to the newly set route can be implemented early. As a result, it is possible to provide highly convenient autonomous driving.

In addition, in the eighth embodiment, the vehicle control based on the temporary route is started before the final operation is performed. Therefore, even in a scene in which the branch point is approached, the autonomous LC directed to the branch lane can be implemented with a time margin. As a result, the convenience of autonomous driving can be further improved.

In the eighth embodiment, when the subject vehicle Am approaches the branch point set on the temporary route before the final operation is performed, the delay warning notification is implemented. Therefore, the driver can recognize that it is better to determine the destination soon. In addition, it is possible to avoid a situation in which a reroute occurs due to the passage of the branch point immediately after the input of the determination operation for determining the destination. According to the above, the convenience of autonomous driving can be further improved. In the eighth embodiment, the information coordination unit 61 corresponds to a "warning implementation unit".

OTHER EMBODIMENTS

Although the multiple embodiments according to the present disclosure have been described above, the present disclosure is not construed as being limited to the above-described embodiments, and can be applied to various embodiments and combinations within a range not departing from the spirit of the present disclosure. The HCU 100 according to the above embodiments can implement both the Level-3-continuation notification and the Level-3-interruption notification regardless of whether a new route is set. In contrast, in a first modification of the above embodiments, when a new route setting is performed, both the Level-3-continuation notification and the Level-3-interruption notification are performed, and meanwhile, when a reroute is implemented, only the Level-3-interruption notification of the Level-3-continuation notification and the Level-3-interruption notification is implemented. That is, when the autonomous travel control is continued even when the reroute occurs, the Level-3-continuation notification is not implemented. According to the first modification, since the notification due to the update of the route is limited, a trouble caused by the notification can be reduced.

In a second modification of the above embodiments, only the Level-3-interruption notification is implemented, and the Level-3-continuation notification is not implemented. That is, when the autonomous travel control is continued regardless of whether the route setting is the new route setting, the continuation possibility notification is not implemented.

In a third modification of the above embodiments, when the new route setting occurs, the autonomous travel control is at least temporarily interrupted regardless of whether a lane change is scheduled. In a fourth modification of the above embodiments, when the new route setting occurs, the continuation of the autonomous travel control is permitted. For example, if a lane change in a state with no periphery monitoring obligation is permitted under regulation, the presence or absence of a scheduled lane change may not be considered. Further, in a fifth modification of the first embodiments, even when a route setting is the new route setting, similarly to the case of the reroute setting, whether to continue the autonomous travel control is determined according to the control mode of the autonomous travel control being implemented.

The modes of the continuation possibility notification in the above embodiments may be appropriately changed. As an example, the presentation control unit 88 may use the HUD 23 for at least one of the Level-3-continuation notification and the Level-3-interruption notification. Further, when the autonomous travel control is interrupted along with the route setting, details of a reason for the interruption may be displayed on the CID 22. Further, a display color, a display size, display luminance, animation, presence or absence of blinking, and the like of contents used for the continuation possibility notification may be appropriately changed. Further, when the driver is urged to act, reproduction of the voice message may be implemented as appropriate.

In a sixth modification of the above-described embodiments, functions of the driving support ECU 50*a* and the autonomous driving ECU 50*b* are provided by one autonomous driving ECU. That is, the function of the driving support ECU 50*a* is implemented in the autonomous driving ECU 50*b* according to the sixth modification. In the sixth modification, the integrated autonomous driving ECU corresponds to the "automated driving control device". Further, a function of the HCU 100 may be further implemented in the integrated autonomous driving ECU. In this embodiment, the autonomous driving ECU corresponds to the "presentation control device". In addition, at least a part of the functions of the navigation ECU 38 may be implemented in the autonomous driving ECU.

Further, in a mode in which the automated driving control and the presentation control according to the present disclosure are implemented by coordination of the autonomous driving ECU 50*b* and the HCU 100, a system including the automated driving control and the presentation control corresponds to the "automated driving control device" and the "presentation control device". A system including at least one of the autonomous driving ECU 50*b* and the HCU 100 and the navigation ECU 38 may correspond to the "automated driving control device" and the "presentation control device".

In seventh and eighth modifications of the fourth embodiment, when the new route is a route passing through the unupdated area, the determination of whether the update of the three-dimensional map data can be completed is omitted. In the seventh modification, when the route passes through the unupdated area, the autonomous travel control is ended after the unupdated area notification is implemented. In the eighth modification, the autonomous travel control is continued even after the unupdated area notification is implemented, and when the update is not completed at a timing of approaching the unupdated area, the autonomous travel control is ended. Further, in the seventh and eighth modifications, the action proposal notification may not be implemented.

In a ninth modification of the sixth embodiment, the standby period is set only when the reroute is performed, and the standby period is not set when the new route setting is performed. In a tenth modification of the seventh embodiment, the vehicle control is started after the completion of the guidance notification regardless of the presence or absence of the travel history. On the other hand, in an eleventh modification of the seventh embodiment, the start of the vehicle control before the guidance notification is permitted regardless of the presence or absence of the travel history. Further, in the fifth to eighth embodiments, at least a part of the series of setting operations including the determination operation may be implemented by a voice input.

In the above-described embodiments, the functions provided by the driving support ECU, the autonomous driving ECU, and the HCU can be provided by software and hardware for executing the software, only software, only hardware, or a composite combination thereof. Further, when providing the functions by an electronic circuit serving as hardware, the functions can be provided by a digital circuit including a large number of logic circuits or by an analog circuit.

Each processing unit in the above-described embodiments is hardware for a calculation process in cooperation with the RAM. The processing unit includes at least one arithmetic core such as a central processing unit (CPU) and a graphics processing unit (GPU). The processing unit may further include a field-programmable gate array (FPGA), a neural network processing unit (NPU), an IP core having another dedicated function, and the like. The processing unit according to the above-described embodiments may be individually mounted on a printed circuit board, or may be mounted on an application specific integrated circuit (ASIC), an FPGA, or the like.

A form of a storage medium (a non-transitory tangible computer-readable medium, that is, a non-transitory tangible storage medium) that stores various programs and the like may also be appropriately changed. The storage medium is not limited to a configuration provided on a circuit board, and may be provided in a form of a memory card or the like, inserted into a slot portion, and electrically connected to a control circuit of the autonomous driving ECU or the HCU. Further, the storage medium may be an optical disk, a hard disk drive or the like serving as a copy source or distribution source of a program to the autonomous driving ECU or the HCU.

The vehicle on which the autonomous driving system and the HMI system are mounted is not limited to a general private passenger vehicle, and may be a rental vehicle, a manned taxi vehicle, a ride-sharing vehicle, a cargo vehicle, a bus, or the like. The vehicle on which the autonomous driving system and the HMI system are mounted may be a right-hand drive vehicle or a left-hand drive vehicle. Further, a traffic environment in which the vehicle travels may be a traffic environment in which left-hand traffic is the norm or a traffic environment in which right-hand traffic is the norm. The information presentation control and the automated driving control according to the present disclosure may be optimized as appropriate in accordance with the road traffic law of each country and region, the steering wheel position of the vehicle, and the like.

The control unit and the method thereof described in the present disclosure may be implemented by a dedicated computer constituting a processor programmed to execute one or multiple functions embodied by a computer program. Alternatively, the device and the method thereof according to the present disclosure may be implemented by a dedicated hardware logic circuit. Alternatively, the device and the method thereof according to the present disclosure may be implemented by one or more dedicated computers implemented by a combination of a processor that executes a computer program and one or more hardware logic circuits. The computer program may be stored in a non-transitory tangible computer-readable recording medium as an instruction to be executed by a computer.

The invention claimed is:

1. A presentation control device for controlling presentation of information related to an automated driving function that enables a subject vehicle to travel with autonomous traveling control with no periphery monitoring obligation of a driver, the device comprising:

a control grasping unit configured to grasp a state of automated driving control performed by the automated driving function after a setting of a route that is set to a destination and set in a state where the automated driving function causes the subject vehicle to be traveling with the autonomous traveling control; and a notification control unit configured to provide notification indicating the state of the automated driving control after the setting of the route, wherein the control grasping unit grasps a type of a lane change when the lane change by the autonomous traveling control is scheduled within a predetermined time or a predetermined distance after the setting of the route, and the notification control unit is configured to change an intensity of notification indicating execution of the lane change according to the type of the lane change.

2. The presentation control device according to claim 1, wherein the notification control unit provides the notification indicating the state of the automated driving control after the setting of the route when, in a state where the route has not been set, the route for traveling of the subject vehicle with the autonomous traveling control is newly set.

3. The presentation control device according to claim 1, wherein the notification control unit provides notification indicating continuation of the autonomous traveling control when the automated driving function continues the autonomous traveling control after the setting of the route.

4. The presentation control device according to claim 1, wherein the notification control unit provides notification indicating a change in a state of the automated driving when the automated driving function does not continue the autonomous traveling control after the setting of the route.

5. The presentation control device according to claim 1, wherein the control grasping unit is configured to grasp a schedule of driving-takeover within a predetermined time or a predetermined distance after the setting of the route, and the notification control unit provides notification indicating an occurrence of the driving-takeover when the schedule of the driving-takeover is grasped.

6. The presentation control device according to claim 1, wherein the notification control unit provides notification indicating interruption of the autonomous traveling control when a lane change in the subject vehicle is scheduled within a predetermined time or a predetermined distance after the setting of the route.

7. The presentation control device according to claim 1, wherein the control grasping unit is configured to grasp, as the type of the lane change, whether the lane change is movement to a branch lane or movement to an adjacent lane for preparation of the movement to the branch lane, and in a case of the movement to the branch lane, the notification control unit increases the intensity of the notification indicating the execution of the lane change more than a case of the movement to the adjacent lane.

8. The presentation control device according to claim 1, wherein when the driver performs a series of setting operations for setting the destination, before determination operation for determining the destination, the notification control unit provides notification indicating vehicle control that is scheduled to be performed by the automated driving function after determination of the destination.

9. A non-transitory tangible computer-readable storage medium storing a presentation control program for controlling presentation of information related to an automated driving function that enables a subject vehicle to travel with autonomous traveling control with no periphery monitoring obligation of a driver, the program causing at least one processor to execute a process of:

grasping a state of automated driving control performed by the automated driving function after a setting of a route that is set to a destination for the subject vehicle and set in a state where the automated driving function causes the subject vehicle to be traveling with the autonomous traveling control; and providing notification indicating the state of the automated driving control after the setting of the route, wherein the at least one processor grasps a type of a lane change when the lane change by the autonomous traveling control is scheduled within a predetermined time or a predetermined distance after the setting of the route, and is configured to change an intensity of notification indicating execution of the lane change according to the type of the lane change.

10. An automated driving control device that enables a subject vehicle to travel with autonomous traveling control with no periphery monitoring obligation of a driver, the device comprising:

a route information grasping unit configured to grasp a change in a route to a destination set for the subject vehicle;

a continuation determination unit configured to determine whether to permit continuation of the autonomous traveling control after the route is changed according to a control mode of the autonomous traveling control that is being performed; and a travel control unit configured to wait for a start of vehicle control based on a changed route until the subject vehicle travels for a predetermined time or a predetermined distance after guidance notification for guiding the driver along the changed route when the route information grasping unit grasps a change in route information.

11. The automated driving control device according to claim 10, wherein the continuation determination unit permits the continuation of the autonomous traveling control also after the route is changed, when the control mode of the autonomous traveling control that is being performed is traffic congestion limit control performed only for traveling during a traffic congestion.

12. The automated driving control device according to claim 10, wherein the continuation determination unit limits the continuation of the autonomous traveling control after the route is changed, when the control mode of the autonomous traveling control that is being performed is area limit control performed only in a specific area.

13. The automated driving control device according to claim 10, wherein the travel control unit waits for the start of the vehicle control based on a changed route until the subject vehicle starts for the predetermined time or the predetermined distance after the guidance notification when the route information grasping unit grasps a change in the route information and the continuation determination unit permits the continuation of the autonomous traveling control.

14. The automated driving control device according to claim 10, further comprising a travel control unit configured to start vehicle control based on a changed route after execution of guidance notification for guiding the driver along the changed route when the route information grasping unit grasps a change in the route information.

15. The automated driving control device according to claim 11, further comprising a travel control unit configured to start vehicle control based on a changed route before execution of guidance notification for guiding the driver along the changed route when the route information grasping unit grasps a change in the route information.

16. The automated driving control device according to claim 10, further comprising:

a travel control unit configured to perform vehicle control based on a changed route when the route information grasping unit grasps a change in the route; and a history determination unit configured to determine whether a road in which the subject vehicle is traveling is a previously traveling road in a history, wherein the travel control unit starts the vehicle control based on the changed route before execution of guidance notification for guiding the driver along the changed route when the road in which the subject vehicle is traveling is the previously traveling road in the history, and the travel control unit starts the vehicle control based on the changed route after the execution of guidance notification indicating the changed route when the road in which the subject vehicle is traveling is not the previously traveling road in the history.

17. The automated driving control device according to claim 10, wherein when the driver performs a series of setting operations for setting the destination, before determination operation for determining the destination, the route information grasping unit grasps, as a temporary route, at least a part of the route to the destination that is predicted to be set.

18. The automated driving control device according to claim 17, further comprising a travel control unit configured to start vehicle control based on the temporary route grasped by the route information grasping unit before the determination operation.

19. The automated driving control device according to claim 17, further comprising a warning implementation unit configured to warn the driver about a possibility delay of arrival to the destination when the subject vehicle approaches a branch point set in the temporary route before the determination operation.

20. A non-transitory tangible computer-readable storage medium storing an automated driving control program that enables a subject vehicle to travel with autonomous traveling control with no periphery monitoring obligation of a driver, the program causing at least one processing unit to execute a process of:

grasping a change in a route to a destination set for the subject vehicle;

determining whether to permit continuation of the autonomous traveling control after the route is changed according to a control mode of the autonomous driving control that is being performed; and waiting for a start of vehicle control based on a changed route until the subject vehicle travels for a predetermined time or a predetermined distance after guidance notification for guiding the driver along the changed route when a change in route information is grasped.

21. An automated driving control device that enables a subject vehicle to travel with autonomous traveling control with no periphery monitoring obligation of a driver, the device comprising:

a route information grasping unit configured to grasp a change in a route to a destination set for the subject vehicle; and a continuation determination unit configured to determine whether to permit continuation of autonomous traveling control after the route is changed in a state where the subject vehicle is traveling with the autonomous traveling control, wherein the route information grasping unit is configured to further grasp whether a change in the route is a change by a system of the subject vehicle or a change in an input from an occupant of the subject vehicle, the continuation determination unit permits the continuation of the autonomous traveling control also after the route has been changed when the system has changed the route, and limits the continuation of the autonomous traveling control after the route has been changed when the input of the occupant has changed the route, and the system searches for a route in which no lane change occurs within a predetermined period or a predetermined distance from a current position, and proposes the change in the route only when finding the route without occurrence of immediate lane change.

22. The automated driving control device according to claim 21, wherein the immediate lane change is lane change that occurs during the predetermined period or the predetermined distance, and the continuation determination unit selects, for route proposal to the driver, the route in which no lane change occurs.

23. A non-transitory tangible computer-readable storage medium storing an automated driving control program that enables a subject vehicle to travel with autonomous traveling control with no periphery monitoring obligation of a driver, the program causing at least one processing unit to execute a process of:

grasping a change in a route of a destination set for the subject vehicle;

further grasping whether the change in the route is a change by a system of the subject vehicle or a change in an input from an occupant of the subject vehicle;

determining whether to permit continuation of autonomous traveling control after the route is changed in a state where the subject vehicle is traveling with the autonomous traveling control;

permitting the continuation of the autonomous traveling control also after the route has been changed when the system has changed the route; and limiting the continuation of the autonomous traveling control after the route has been changed when the input of the occupant has changed the route, wherein the system searches for a route in which no lane change occurs within a predetermined period or a predetermined distance from a current position, and proposes the change in the route only when finding the route without occurrence of immediate lane change.

24. The non-transitory tangible computer-readable storage medium according to claim 23, wherein the immediate lane change is lane change that occurs during the predetermined period or the predetermined distance, and the at least one processing unit selects, for route proposal to the driver, the route in which no lane change occurs.

25. An automated driving control device that enables a subject vehicle to travel with autonomous traveling control with no periphery monitoring obligation of a driver, the device comprising:

a route information grasping unit configured to grasp a change in a route to a destination set for the subject vehicle, and further grasp whether the change in the route is accompanied by a change in the destination;

a continuation determination unit configured to determine whether to permit continuation of autonomous traveling control after the route is changed in a state where the subject vehicle is traveling with the autonomous traveling control, wherein the continuation determination unit permits the continuation of the autonomous traveling control also after the route has been changed when the destination has been maintained and the route has been changed, and limits the continuation of the autonomous traveling control after the destination has been changed and the route has been changed, and when limiting the continuation of the autonomous traveling control, the continuation determination unit shifts the autonomous traveling control with the periphery monitoring obligation to the autonomous traveling control with no periphery monitoring obligation.

26. A non-transitory tangible computer-readable storage medium storing an automated driving control program that enables a subject vehicle to travel with autonomous traveling control with no periphery monitoring obligation of a driver, the program causing at least one processing unit to execute a process of:

grasping a change in a route to a destination set for the subject vehicle, and further grasping whether the change in the route is accompanied by a change in the destination;

determining whether to permit continuation of autonomous traveling control after the route is changed in a state where the subject vehicle is traveling with the autonomous traveling control;

permitting the continuation of the autonomous traveling control also after the route has been changed when the destination has been maintained and the route has been changed; and limiting the continuation of the autonomous traveling control after the destination has been changed and the route has been changed, wherein when limiting the continuation of the autonomous traveling control, the at least one processing unit shifts the autonomous traveling control with the periphery monitoring obligation to the autonomous traveling control with no periphery monitoring obligation.

27. A presentation control device for controlling presentation of information related to an automated driving function that enables a subject vehicle to travel with autonomous traveling control with no periphery monitoring obligation of a driver, the device comprising:

a control grasping unit configured to determine whether a route to a destination passes through an unupdated area that requires an update of map data when the route has been searched in a state where the automated driving function causes the subject vehicle to be traveling with the autonomous traveling control using the map data; and a notification control unit configured to provide notification indicating an existence of the unupdated area when the route passes through the unupdated area, wherein the notification control unit proposes an action to delay reach of the subject vehicle to the unupdated area when completion of an update of the map data of the unupdated area is not possible before the subject vehicle reaches the unupdated area.

28. The presentation control device according to claim 27, wherein the notification control unit provides notification indicating that a setting of a searched route to the automated driving function is possible when completion of an update of the map data of the unupdated area is possible before the subject vehicle reaches the unupdated area.

29. The presentation control device according to claim 28, wherein the notification control unit provides notification indicating a possibility that autonomous traveling control is interrupted when an update of the map data of the unupdated area has not been completed and the subject vehicle has approached the unupdated area.

30. A non-transitory tangible computer-readable storage medium storing a presentation control program for controlling presentation of information related to an automated driving function that enables a subject vehicle to travel with autonomous traveling control with no periphery monitoring obligation of a driver, the program causing at least one processor to execute a process of:

determining whether a route to a destination passes through an unupdated area that requires an update of map data when the route has been searched in a state where the automated driving function causes the subject vehicle to be traveling with the autonomous traveling control using the map data; and providing notification indicating an existence of the unupdated area when the route passes through the unupdated area, wherein the at least one processor proposes an action to delay reach of the subject vehicle to the unupdated area when completion of an update of the map data of the unupdated area is not possible before the subject vehicle reaches the unupdated area.

* * * * *